US010540705B2

(12) United States Patent
Agarwal et al.

(10) Patent No.: US 10,540,705 B2
(45) Date of Patent: Jan. 21, 2020

(54) SYSTEM AND MEDIUM FOR CHECKING-IN A CUSTOMER

(71) Applicant: Wal-Mart Stores, Inc., Bentonville, AR (US)

(72) Inventors: Gaurav Agarwal, Santa Clara, CA (US); Arnon Katz, San Mateo, CA (US); Mayan Cohen, San Mateo, CA (US); Pushkar Pande, Bentonville, AR (US); Michal Russ, Menlo Park, CA (US); Sharanjeet Shingh Grewal, San Ramon, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 513 days.

(21) Appl. No.: 15/339,808

(22) Filed: Oct. 31, 2016

(65) Prior Publication Data
US 2018/0121992 A1 May 3, 2018

(51) Int. Cl.
*G06Q 30/00* (2012.01)
*G06Q 30/06* (2012.01)
*H04W 4/029* (2018.01)

(52) U.S. Cl.
CPC ........ *G06Q 30/0635* (2013.01); *H04W 4/029* (2018.02)

(58) Field of Classification Search
CPC ... G06Q 30/0635; H04W 4/029; H04W 4/023
See application file for complete search history.

(56) References Cited

U.S. PATENT DOCUMENTS

| 2007/0088624 | A1* | 4/2007 | Vaughn | G06Q 30/02 705/15 |
| 2011/0161001 | A1* | 6/2011 | Fink | G01C 21/3492 701/533 |

(Continued)

OTHER PUBLICATIONS

Dumas, Yvan, Jacques Desrosiers, and Francois Soumis. "The pickup and delivery problem with time windows." European journal of operational research 54.1 (1991): 7-22. (Year: 1991).*

(Continued)

*Primary Examiner* — Matthew E Zimmerman
(74) *Attorney, Agent, or Firm* — Bryan Cave Leighton Paisner LLP

(57) ABSTRACT

A customer check-in system includes a server computer of a store including a processor programmed to install a customer application on a customer mobile computing device, install an associate application on an associate mobile computing device, receive a signal from the customer device including a unique customer identification, an indication that the customer has checked-in to pick up an order, and a customer-selected time slot for picking up the order, obtain tracking information of a current location of the customer device, utilize the tracking information to estimate a travel time remaining until the customer device arrives at the store, transmit a signal to the associate device including the customer identification and a first estimated time remaining, and transmit at least one signal to the associate device including an updated estimated time remaining and an instruction to display a graphical representation of the updated time remaining on the associate device.

23 Claims, 20 Drawing Sheets

(56) References Cited

U.S. PATENT DOCUMENTS

| | | | |
|---|---|---|---|
| 2014/0164179 A1* | 6/2014 | Geisinger | G06Q 30/02 |
| | | | 705/26.41 |
| 2014/0379529 A1* | 12/2014 | Agasti | G06Q 30/0635 |
| | | | 705/26.81 |
| 2016/0061620 A1* | 3/2016 | Newlin | G01C 21/3676 |
| | | | 701/533 |
| 2016/0063604 A1* | 3/2016 | Shaffer | G06F 16/29 |
| 2016/0232515 A1* | 8/2016 | Jhas | G06Q 30/02 |
| 2016/0247113 A1* | 8/2016 | Rademaker | G06Q 10/063114 |
| 2017/0124511 A1* | 5/2017 | Mueller | G06Q 10/0837 |

OTHER PUBLICATIONS https://curbside.com/faq/; 5 pages; downloaded on Dec. 21, 2016.

* cited by examiner

SYSTEM AND MEDIUM FOR CHECKING-IN A CUSTOMER

FIELD OF THE DISCLOSURE

The present disclosure relates generally to customer check-in systems and non-transitory computer-readable storage media for checking-in a customer.

BACKGROUND

Many customers desire to order items or goods remotely, e.g., online, through the Internet, or using a specially designed application or app on a mobile computing device, such as a tablet or cellular phone. The customer may also desire that the items or goods set forth in the customer order be assembled and ready for the customer to pick-up at a specific location, e.g., at a particular store, typically at a specific time.

For pick-up orders, the store often sets or identifies a time slot for when the customer order will be ready for pick-up (such as, e.g., between 2:00 pm and 5:00 pm on Monday, Oct. 31, 2016). Typically, the customer order is filled and ready for pick-up at the beginning of the identified time slot (such as at 2:00 pm in the previous example). However, in some instances, the customer may not arrive at the store until the end of the time slot (such as around 5:00 pm in the previous example) or shortly thereafter. For grocery orders, particularly if the order is filled at the beginning of the time slot, certain perishable items could spoil and/or frozen items could thaw while waiting for the customer to arrive to pick-up the order. To prevent this spoilage or undesirable thawing from happening, the store associate may wait until the customer arrives before filling the order. However, such method for filling customer orders is inefficient, and often undesirably increases customer wait time.

The present disclosure is aimed at solving the problems identified above.

SUMMARY

In different embodiments of the present disclosure, systems and non-transitory computer-readable storage media are provided for checking-in a customer.

In one embodiment of the present disclosure, a customer check-in system associated with a store comprises a server computer of the store and including a processor coupled to a memory device with the processor being programmed to: install a customer application on a customer mobile computing device having a processor, a memory device, and a touchscreen, with the memory device of the customer mobile computing device storing the customer application that, when executed, causes the processor of the customer mobile computing device to display a graphical user interface that is usable by the customer; install an associate application on an associate mobile computing device having a processor, a memory device, and a touchscreen, with the memory device of the associate mobile computing device storing the associate application that, when executed, causes the processor of the associate mobile computing device to display a graphical user interface that is usable by an associate of the store; receive, from the customer mobile computing device, a signal including a unique customer identification associated with the customer mobile computing device, an indication that the customer has checked-in to pick up a customer order from the store, and a customer-selected time slot for picking up the customer order from the store; during the time slot, obtain tracking information of a current location of the customer mobile computing device; utilize the tracking information to estimate an amount of travel time remaining until the customer mobile computing device arrives at the store; transmit a signal to the associate mobile computing device including the unique customer identification and a first estimated travel time remaining until the customer mobile computing device associated with the unique customer identification arrives at the store; and transmit at least one signal to the associate mobile computing device including an updated estimated amount of travel time remaining until the customer mobile computing device arrives at the store and an instruction to display a graphical representation of the updated estimated amount of travel time remaining on the touchscreen of the associate mobile computing device.

In another embodiment of the present disclosure, one or more non-transitory computer-readable storage media has computer-executable instructions embodied thereon and when executed by at least one processor, the computer-executable instructions cause the processor to: operate a customer mobile computing device to display a graphical user interface that is usable by the customer on a touchscreen of the customer mobile computing device; operate an associate mobile computing device to display a graphical user interface that is usable by an associate of the store on a touchscreen of the associate mobile computing device; operate a server computer to receive a signal including a unique customer identification associated with the customer mobile computing device, an indication that the customer has checked-in to pick up a customer order from the store, and a customer-selected time slot for picking up the customer order from the store; operate the server computer to obtain tracking information of a current location of the customer mobile computing device during the time slot; operate the server computer to utilize the tracking information to estimate an amount of travel time remaining until the customer mobile computing device arrives at the store; operate the server computer to transmit a signal to the associate mobile computing device including the unique customer identification and a first estimated travel time remaining until the customer mobile computing device associated with the unique customer identification arrives at the store; and operate the server computer to transmit at least one signal to the associate mobile computing device including an updated estimated amount of travel time remaining until the customer mobile computing device arrives at the store and an instruction to display a graphical representation of the updated estimated amount of travel time remaining on the touchscreen of the associate mobile computing device.

In another embodiment of the present disclosure, a customer check-in system associated with a store comprises a server computer of the store and including a processor coupled to a memory device with the processor being programmed to: install a customer application on each of a plurality of customer mobile computing devices each having a processor, a memory device, and a touchscreen, with the memory device of the customer mobile computing device storing the customer application that, when executed, causes the processor of the customer mobile computing device to display a graphical user interface that is usable by the customer; install an associate application on an associate mobile computing device having a processor, a memory device, and a touchscreen, with the memory device of the associate mobile computing device storing the associate application that, when executed, causes the processor of the associate mobile computing device to display a graphical user interface that is usable by an associate of the store; receive, from each of the customer mobile computing devices, a signal including a unique customer identification associated with the customer mobile computing device and an indication that the customer has checked-in to pick up a customer order from the store; obtain tracking information of a current location of each of the customer mobile computing devices; utilize the tracking information to estimate an amount of travel time remaining until each of the customer mobile computing devices arrive at the store; transmit a signal to the associate mobile computing device including the unique customer identification and a first estimated travel time remaining until the customer mobile computing device associated with the unique customer identification arrives at the store, the signal further including an instruction to display a listing, on the touchscreen of the associate mobile computing device, including the unique customer identification for each of the customer mobile computing devices and a graphical representation of the estimated travel time remaining for each of the customer mobile computing devices, with the listing including the unique customer identification arranged from the shortest to the longest travel time remaining until the customer mobile computing devices arrive at the store; and transmit at least one signal to the associate mobile computing device including an updated estimated travel time remaining until each of the customer mobile computing devices arrives at the store, the signal further including an instruction to rearrange the unique customer identifications in the listing if the current order of the unique customer identifications based on the updated estimated remaining travel time is no longer ordered from the shortest to the longest remaining travel time.

In another embodiment of the present disclosure, one or more non-transitory computer-readable storage media has computer-executable instructions embodied thereon and when executed by at least one processor, the computer-executable instructions cause the processor to: operate a customer mobile computing device to display a display a graphical user interface that is usable by the customer on a touchscreen of the customer mobile computing device; operate an associate mobile computing device to display a graphical user interface that is usable by an associate of the store on a touchscreen of the associate mobile computing device; operate a server computer to receive a signal including a unique customer identification associated with the customer mobile computing device and an indication that the customer has checked-in to pick up a customer order from the store; operate the server computer to obtain tracking information of a current location of the customer mobile computing device during the time slot; operate the server computer to utilize the tracking information to estimate an amount of travel time remaining until the customer mobile computing device arrives at the store; operate the server computer to transmit a signal to the associate mobile computing device including the unique customer identification and a first estimated travel time remaining until the customer mobile computing device associated with the unique customer identification arrives at the store, the signal further including an instruction to display a listing, on the touchscreen of the associate mobile computing device, including the unique customer identification for each of the customer mobile computing devices and a graphical representation of the estimated travel time remaining for each of the customer mobile computing devices, with the listing including the unique customer identification arranged from the shortest to the longest travel time remaining until the customer mobile computing devices arrive at the store; and operate the server computer to transmit at least one signal to the associate mobile computing device including an updated estimated travel time remaining until each of the customer mobile computing devices arrives at the store, the signal further including an instruction to rearrange the unique customer identifications in the listing if the current order of the unique customer identifications based on the updated estimated remaining travel time is no longer ordered from the shortest to the longest remaining travel time.

BRIEF DESCRIPTION OF THE DRAWINGS

Advantages of the present disclosure will be readily appreciated, as the same becomes better understood by reference to the following detailed description, when considered in connection with the accompanying drawings. Non-limiting and non-exhaustive embodiments and examples of the present disclosure are described with reference to the following figures, wherein like numerals refer to like parts throughout the various views unless otherwise specified.

DETAILED DESCRIPTION

Figure 1:
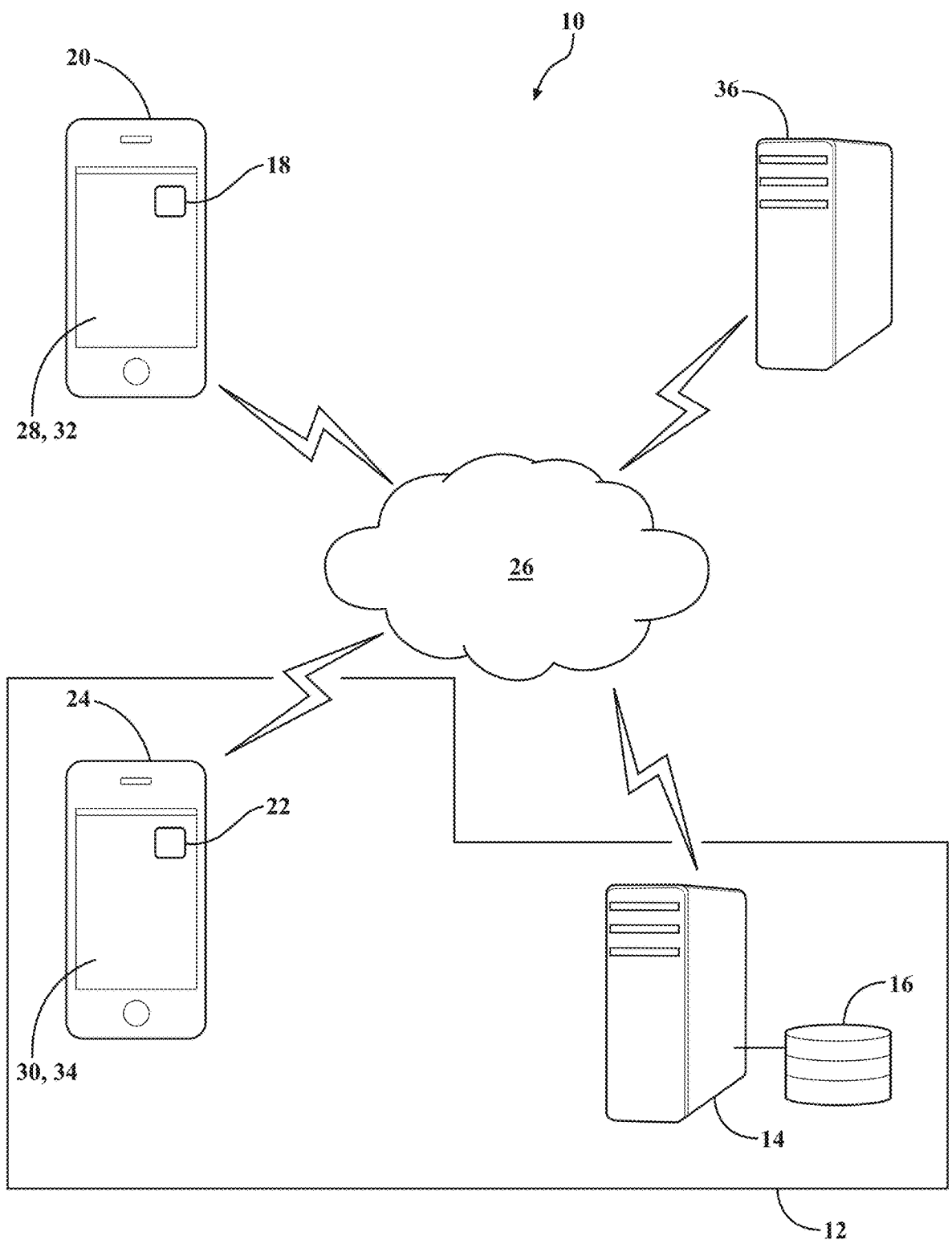
FIG. 1 is a schematic illustrating an embodiment of a customer check-in system.

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "in one example," or "in an example" in various places throughout this specification are not necessarily all referring to the same embodiment or example. Furthermore, the particular features, structures, or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments and/or examples in accordance with the present disclosure may be embodied as an apparatus, a method, or a computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system". Furthermore, the present disclosure may take the form of a computer program product embodied in any tangible media or expression having computer-usable program code embodied in the media.

Any combination of one or more computer-usable or computer-readable media (or medium) may be utilized. For example, computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM) device, an optical storage device, and a magnetic storage device. Computer program code (e.g., computer-executable instructions) for carrying out operations of the present disclosure may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisional via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams(s) in the flow diagram(s) illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagram(s) and/or flowchart illustration(s), and combinations of blocks in the block diagram(s) and/or flowchart illustration(s), may be implemented by special purpose hardware-based systems that perform the specified functions or acts, or combinations of special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media product an article of manufacture including instruction means which implement the function/act specified in the flowchart and/or block diagram block or blocks.

Several (or different) elements discussed below, and/or claimed, are described as being "coupled," "in communication with," or "configured to be in communication with." This terminology is intended to be non-limiting, and where appropriate, be interpreted to include without limitation, wired and wireless communication using any one or a plurality of suitable protocols, as well as communication methods that are constantly maintained, are made on a periodic basis, and/or made or initiated on an as needed basis.

In addition, and for clarity in discussing the various functions of the system of the present disclosure, multiple server computers (or just computers or servers) are discussed as performing different functions. These different server computers may, however, be implemented in different ways such as modules within a single computer, as nodes of a computer system, etc. The functions performed by the system (or nodes or modules) may be centralized or distributed in any suitable manner across the system and its components, regardless of the location of specific hardware. Furthermore, specific components of the system may be referenced using functional terminology in their names. The functional terminology is used solely for the purposes of naming convention and to distinguish one element from another in the following discussion. Unless otherwise specified, the name of an element conveys no specific functionality to the element or component.

With reference to the figures, and in operation, the present disclosure provides a system 10, method, and one or more non-transitory computer-readable storage media for checking-in a customer. In certain embodiments, the present disclosure describes how a customer can utilize a customer application stored or resident on his/her mobile computing device (i.e., the customer mobile computing device) to check-in for picking up a customer order from a store. In these embodiments, the present disclosure further describes how a processor of a server computer associated with the store notifies an associate at the store (such as by pushing a notification signal to the associate's mobile computing device) that the customer has checked-in. The server computer also and tracks the location of the customer mobile computing device in order to determine an amount of travel time remaining before the customer arrives at the store. The server computer also determines the customer's approximate arrival time based on the current location of the customer mobile computing device. The travel time remaining and approximate arrival time can be used, by the associate at the store (which is displayed on the touchscreen of the associate mobile computing device), to gauge when he/she should begin filling the customer order so that the order is ready by the time the customer arrives at the store. In other embodiments, the present disclosure describes how a server computer at the store can detect when the customer mobile computing device is near and/or approaching the store, and upon determining that the customer has a pending customer order, the server computer can automatically check-in the customer for pick-up of the customer order.

The embodiments of the present disclosure advantageously provide an improvement with servicing customers of a store who have pending customer orders for pick-up. Utilizing the customer application resident on the customer mobile computing device, the customer can check-in and, in certain embodiments, select a time slot for picking up the order. By tracking the location of the customer mobile device, the server computer can notify an associate at the store that the customer is on his/her way and provide an estimate for an amount of time remaining until the customer is expected to arrive at the store. In this way, the efficiency of filling a customer order by the store is improved in that the associate has been timely notified so that he/she can have the order ready by the time the customer arrives. In addition, the efficiency of the customer is also improved in that the customer typically does not have to wait for his/her order once the customer has arrived at the store.

The embodiments of the present disclosure also advantageously improves the functionality of the server computer in that the server computer can track the location of the customer mobile computing device to determine how far away the customer is and how long before the customer arrives at the store. The server computer is improved, as well as the functionality and efficiency of the customer pick-up system by the store, by utilizing the tracking information to determine when a customer is expected to arrive or when the customer turns around and is no longer heading toward the store. In instances where the customer turns around, the server computer can push a notification signal to the associate mobile computing device that the customer has turned around and to put items of the customer order back on the shelves, in the freezer, etc. In certain embodiments, the server computer is also improved by being able to automatically check a customer in by detecting that the customer mobile computing device is within a wireless hotspot associated with and/or about the store. When automatically checked-in, the server computer can push a notification signal to the associate mobile computing device that the customer is on his/her way to pick-up a pending customer order.

An example of a customer check-in system 10 is shown in FIG. 1. It will be understood that the present disclosure, as generally described and illustrated in the figures, could be arranged and designed in a wide variety of different configurations. Thus, the following more detailed description of the embodiments of the present disclosure, as represented in the figures, is not intended to limit the scope of the present disclosure, as claimed, but is merely representative of certain examples of presently contemplated embodiments in accordance with the present disclosure. The presently described embodiments may be understood by reference to the figures, where like parts are designated by like numerals throughout.

Referring to the example set forth in FIG. 1, the system 10 includes a store 12, such as a retail store. Specific non-limiting examples of stores include a clothing store, a shoe store, a grocery store, an accessory store, an office supply store, a furniture store, a toy/hobby store, a pet supply store, a hardware store, a home remodeling store, and/or like. In some examples, the store 12 is a combination of retail stores, such as a store which sells clothing, shoes, and grocery, a stores that sells office supplies and furniture, etc. In one particular example, the store 12 is a grocery store.

In an embodiment, the store 12 may be a physical establishment designed for the direct sale of products to a customer. In another embodiment, the store 12 is or includes a web-based store for the sale of products to a customer through the Internet. In another embodiment, the store 12 includes a central office (such as a headquarters) and a plurality of shops designed for the direct sale of products to a customer. In yet another embodiment, the store 12 includes a central office and a plurality of shops for the direct sale of products to a customer, as well as a web-based store for the sale of products over the Internet. In embodiments where the store 12 includes a plurality of shops, the store may include two, three, four . . . , hundreds, or even thousands of shops. Typically, the shops are located in various geographic locations, such as in different cities, in different towns, in different counties, on different streets or roads, on the same street but a mile or two away from one another, etc.

As shown, the system 10 further includes a server computer 14 of the store 12 and a database 16 coupled the server computer 14. The server computer 14 includes a processor and a memory device coupled or connected to the database 16 to retrieve and store information contained in the database 16. Typically, the server computer 14 and the database 16 are located at the central office of the store 12. Alternatively, the server computer 14 and the database 16 may be located offsite (i.e., not at the central office), but are still considered to be part of the central office of the store 12.

The processor of the server computer 14 executes various programs, and thereby controls components of the server computer 14. The processor may be a single processor or a plurality of processors. Further, the processor may be a controller, a microcontroller, a microprocessor, an application specific integrated circuit (ASIC), or a processor working in conjunction with a central processing unit (CPU) performing the function of a general purpose computer. The processor of the server computer 14 may be configured to execute computer programs containing computer-readable and/or executable instructions for performing a selected process. In embodiments where the server computer 14 contains a plurality of processors, the processors can operate in parallel or distributed manner. In an example, the processor of the server computer 14 may execute various modules of the system 10.

The memory coupled to the processor of the server computer 14 may include a read only memory (ROM) and random access memory (RAM) for storing the computer-readable and/or executable instructions of the computer programs. Further, the memory of the server computer 14 may be configured to store programs and information in the database 16, and to retrieve information from the database 16 that may be used by the processor of the server computer 14, a customer application 18 resident on a customer mobile computing device 20, and/or an associate application 22 resident on an associate mobile computing device 24 to perform various process steps associated with the operation of the customer check-in system. The memory may also include, but is not limited to, a hard disc drive, an optical disc drive, and/or a flash memory drive.

The database 16 contains or stores data records containing customer profile information. In an embodiment, the customer profile information includes a customer profile for at least one customer of the store 12. The customer profile for each customer may include identification information of the customer, such as the customer's name, residential or postal address, phone number, electronic mailing (email) address, and other information such as account information (such as credit card information, billing information, coupons, credits, etc.), purchase history including copies of electronic receipts from the customer's previous purchases from the store, customer preferences, etc.

The database 16 further contains customer order information. The customer order information typically includes a list of items that the customer has selected for purchase from the store 12. In an embodiment, the list of items set forth in the customer order information can be created utilizing the customer application 18 resident on the customer mobile computing device 20. For instance, upon entering an appropriate login and password, the customer can access an inventory of the store 12 and select at least one item for purchase utilizing the application 18. The customer application 18 forms a list containing all of the items selected by the customer, and the customer mobile computing device 20 transmits the list of items to the server computer 14 along with a unique customer identification. The server computer 14, utilizing suitable computer program code, creates a customer order which includes the list of selected item(s) received from the customer mobile computing device 20. The server computer 14 utilizes the unique customer identification to identify the appropriate customer profile stored in the database 16, and links or associates the created customer order with the identified customer profile.

In instances where the store 12 includes or has associated therewith a plurality of shops located at different geographic locations, the customer may also designate a particular shop (typically by identifying the address of the particular shop, such as by selecting a particular location from a list of menu options or by typing in the address of the particular location into the customer application 18) that the customer would prefer to pick-up his/her order from. The designation of the particular shop may be transmitted from the customer mobile computing device 20 to the server computer 14 of the store 12, linked with the customer order, and stored together in the database 16. Alternatively, the designation of the particular shop may be transmitted to the server computer 14 with the customer order, and then stored in the database 16.

In an embodiment, each of a number of customers may generate a list of selected item(s), and the lists along with unique customer identifications are transmitted to the server computer 14 from the respective customer mobile computing devices 20. The server computer 14 creates a customer order for each list (and designated shop if the store has a plurality of shops at different locations) received from the customer devices 20, and stores the customer orders in the database 16 with each customer order being linked or associated with the appropriate customer profile. In this way, the server computer 14 generates the database 16 containing each customer order that is created, with each customer order being linked to the appropriate customer profile.

In an embodiment, the customer may utilize the customer application 18 to select a time slot for picking up the customer order (more particularly, the items set forth in the list generated by the customer) from the store. The time slot may include a date and a time range on that date that the customer is available to pick-up the customer order from the store. For example, the customer may select, utilizing the customer application 18 on his/her mobile device 20, to pick-up the order on Oct. 28, 2016 between 2:00 and 5:00 pm. The customer mobile computing device 20 may transmit a signal to the server computer 14 including the customer-selected time slot, and the server computer 14 then links the customer-selected time slot with the customer order stored in the database 16. In another embodiment, the server computer 14 selects a time slot for picking up the customer order and links the customer-selected time slot with the customer order stored in the database 16. In this embodiment, the server computer 14 also transmits a signal to the customer mobile computing device 20 including the computer-selected time slot and an instruction to display the time slot on the customer mobile computing device 20.

The customer profile, customer order information, and time slot may be stored in the same database 16. In another embodiment, the database 16 may include several sub-databases, and customer profile, customer order information, and time slot may be stored in separate sub-databases. In still another embodiment, the database 16 may represent a plurality of databases with the customer profile stored in one of the databases, the customer order information stored in another one of the databases, and the time slot stored in yet another one of the databases.

As shown in FIG. 1, the server computer 14 is coupled in communication to the customer mobile computing device 20 and the associate mobile computing device 24 via a communications network 26. The communications network 26 may be any suitable connection, including the Internet, file transfer protocol (FTP), an Intranet, a local area network (LAN), a virtual private network (VPN), cellular networks, etc. Further, the communications network 26 may utilize any suitable or combination of technologies including, but not limited to, wired and wireless connections, always on connections, connections made periodically, and connections made when needed.

Each of the customer mobile computing device 20 and the associate mobile computing device 24 may include any suitable device that enables the customer and/or an associate at the store 12 to access and communicate with the system 10, including sending and/or receiving information to and from the system 10 and displaying information retrieved from the system 10 to the customer and/or associate at the store 12. Examples of the mobile computing devices 20, 24 include, but are not limited to, a laptop or notebook computer, a tablet computer, a smartphone/tablet computer hybrid, a personal data assistant, a handheld mobile device including a cellular telephone, and/or the like. The mobile computing devices 20, 24, as well as any other connected computer systems and their components included in the system 10, can create message related data and exchange message related data (e.g., near field communication (NFC) payloads, Bluetooth packets, Internet Protocol (IP) datagrams, and other higher layer protocols that utilize IP diagrams, such as Transmission Control Protocol (TCP), Hypertext Transfer Protocol (HTTP), Simple Mail Transfer Protocol (SMTP), etc.) over the communications network 26.

In an embodiment, each of the mobile computing devices 20, 24 is or includes a smartphone or tablet computer. In another embodiment, the each of the mobile computing devices 20, 24 includes a processor coupled to a memory, and a database for storing various programs and data for use in operating the mobile computing devices 20, 24. Each of the mobile computing devices 20, 24 may also include a display screen 28, 30 one or more video imaging cameras, one or more speakers, a microphone, at least one input button, and one or more sensors including, but not limited to, a touch ID fingerprint sensor coupled to the input button, a barometer, a three-axis gyro, an accelerometer, a proximity sensor, and an ambient light sensor. The display screen 28, 30 includes any type of device capable of displaying information to the customer utilizing the mobile computing devices 20, 24, respectively. An example of a display screen 28, 30 includes a touchscreen display device. In addition, the mobile computing devices 20, 24 may include a Wi-Fi antenna, a cellular network antenna, a Bluetooth communications device, assisted GPS unit and GLONASS, a digital compass, and an iBeacon microlocation device.

In an embodiment, each of the mobile computing devices 20, 24 further includes a web browser stored in the memory. The processor of the mobile computing devices 20, 24 executes the web browser program to display webpages on the display screen 28, 30 that includes information received from the server computer 14 of the business to enable the customer to interact with and operate various functions associated with the server computer 14. In addition, the mobile computing devices 20, 24 may be programmed to store and execute a mobile program application (i.e., the customer application 18 and the associate application 22) that displays a user interface 32, 34 on the display screen 28, 30 that allows the customer and/or associate to access the server computer 14 to retrieve and store information, as well as to interact with the server computer 14 for performing one or more process steps of checking-in a customer for picking up a customer order from the store.

The system 10 further includes a website host server 36 configured to host a website (such as a business website) that is accessible by the customer via any computing device having access to the Internet, such as the customer mobile computing device 20. The website host server 36 retrieves and stores webpages associated with one or more websites in response to requests received from the customer via the customer mobile computing device 20. The webpage allows the customer to interact with the website and provide the customer with access to his/her customer profile, customer order, and/or time slot stored in the database 16 by entering an appropriate login and password. In an embodiment, upon accessing the customer profile, the customer can enter, change, and/or update customer profile information such as the customer's name, address, phone number, etc.

As previously mentioned, the processor of the server computer 14 executes various programs, and thereby controls components of the server computer 14. In an embodiment, the processor is programmed to install the customer application 18 on the customer mobile computing device 20 with the memory device of the customer mobile computing device 20 storing the customer application 18 that, when executed, causes the processor of the customer mobile computing device 20 to display the graphical user interface 32 that is usable by the customer. The processor is also programmed to install the associate application 22 on the associate mobile computing device 24 with the memory device of the associate mobile computing device 24 storing the associate application 22 that, when executed, causes the processor of the customer mobile computing device 24 to display the graphical user interface 34 that is usable by an associate of the store 12. Each of the customer 18 and associate 22 applications that are installed on the customer 20 and associate 24 mobile computing devices is a computer program including computer-readable or computer-executable instructions stored in a non-transitory computer-readable medium/media that can direct a computing device (i.e., the customer mobile computing device 20 and the associate mobile computing device 24) or other programmable data processing apparatus to function in a particular manner, such that the instructions stored in the computer-readable or computer-executable medium produce an article of manufacture including instruction means which implement the function/act specified in the flowchart and/or block diagram block or blocks.

In an embodiment, the customer application 18 may be installed or loaded onto the customer mobile computing device 20 to cause a series of operational steps to be performed to check-in a customer for picking up a customer order from the store. The associate application 22 may be installed or loaded onto the associate mobile computing device 24 to cause a series of operational steps to be performed to fill a customer order once the customer has or has been checked-in. Upon entering appropriate authentication information (such as an appropriate login and password), each of the applications 18, 22 performs a series of operational steps of the embodiments of the customer check-in method of the present disclosure. For instance, the customer application 18 can be used, by the customer, to check-in to pick-up a customer order from the store 12. Once the customer has checked-in, the customer application 18 may display a variety of information to the customer on the display screen 28. In an embodiment, the customer application 18 displays the address of the store, an interactive map including a route to the store, the time slot for picking up the customer order, an arrival time, etc. The associate application 22 can be used to provide information to the associate at the store 12, such as a notification that the customer has checked-in, an amount of travel time remaining until the customer arrives at the store 12 or shop based on the current location of the customer mobile computing device 20, a customer-selected color of the customer's car, etc. Such information may be used by the associate in order to timely fill the customer order so that the customer order is ready when the customer arrives at the store.

Alternatively, the customer mobile computing device 20 may recognize a wireless hotspot about the store 12 (or a shop of the store 12). The server computer 14 may identify that the customer mobile computing device 20 is near the store 12 or shop (e.g., within a wireless connection range of the store 12 or shop), check the database 16 to see if the customer associated with the customer device 20 has a pending customer order, and automatically check-in the customer to pick-up the customer order. Once the customer has been checked-in, the server computer 14 can push a notification signal to the customer mobile computing device 12 which, utilizing the customer application 18, displays the notification to the customer on the touchscreen 28 that the customer has been checked-in to pick-up his/her order from the store 12. The server computer 14 also sends a notification signal to the associate mobile computing device 24 which, utilizing the associate application 22, displays the notification to the customer on the touchscreen 30 that the customer has been checked-in and to proceed with filling the customer order so that the order is ready by the time the customer arrives.

Figure 2:
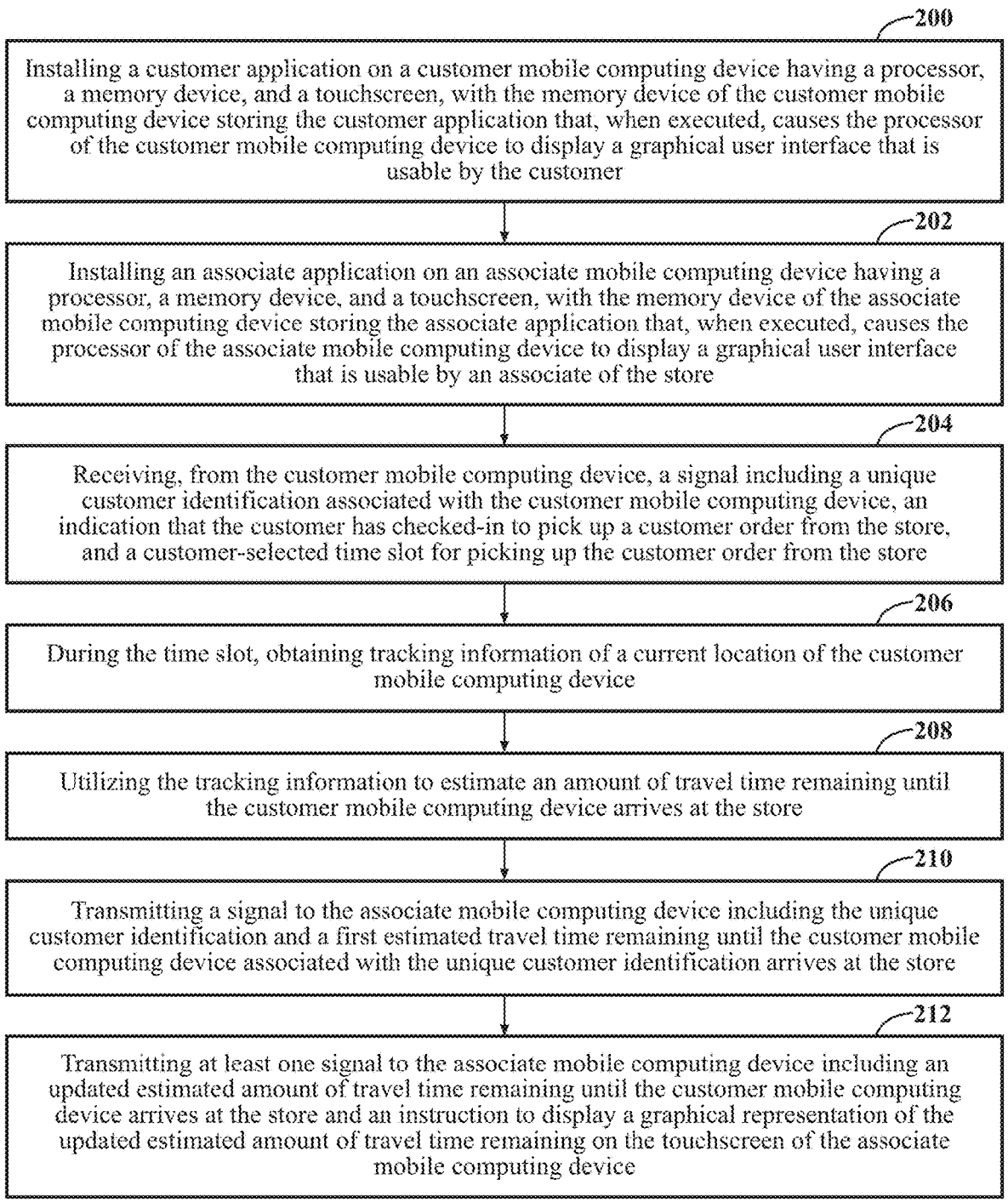
FIG. 2 is a flow diagram illustrating an embodiment of a method for checking-in a customer.

Referring now to FIG. 2, an embodiment of a customer check-in method is described in detail below. This method utilizes the processor of the server computer 14 to perform the steps of: installing the customer application 18 on the customer mobile computing device 20 having a processor, a memory device, and a touchscreen 28, with the memory device of the customer mobile computing device storing the customer application 18 that, when executed, causes the processor of the customer mobile computing device 20 to display the graphical user interface 32 that is usable by the customer (as shown in step 200); installing an associate application 20 on an associate mobile computing device 24 having a processor, a memory device, and a touchscreen 30, with the memory device of the associate mobile computing device 24 storing the associate application 22 that, when executed, causes the processor of the associate mobile computing device 24 to display the graphical user interface 34 that is usable by an associate of the store (as shown in step 202); receiving, from the customer mobile computing device 20, a signal including a unique customer identification associated with the customer mobile computing device 20, an indication that the customer has checked-in to pick-up a customer order from the store, and a customer-selected time slot for picking up the customer order from the store (as shown in step 204); during the time slot, obtaining tracking information of a current location of the customer mobile computing device 20 (as shown in step 206); utilizing the tracking information to estimate an amount of travel time remaining until the customer mobile computing device 20 arrives at the store (as shown in step 208); transmitting a signal to the associate mobile computing device 24 including the unique customer identification and a first estimated travel time remaining until the customer mobile computing device 20 associated with the unique customer identification arrives at the store (as shown in step 210); and transmitting at least one signal to the associate mobile computing device 24 including an updated estimated amount of travel time remaining until the customer mobile computing device 20 arrives at the store and an instruction to display a graphical representation of the updated estimated amount of travel time remaining on the touchscreen 30 of the associate mobile computing device 24 (as shown in step 212).

Details of this embodiment of the method are described below with reference to FIGS. 3-13. In this embodiment of the method, which is described in detail below, the customer 20 and the associate 24 mobile computing devices are smartphones with the customer 18 and associate 22 applications loaded or resident on the devices 20, 24. While the figures illustrate the smartphones as resembling iPhones®, it is to be understood that any suitable smartphone can be used.

Figure 3:
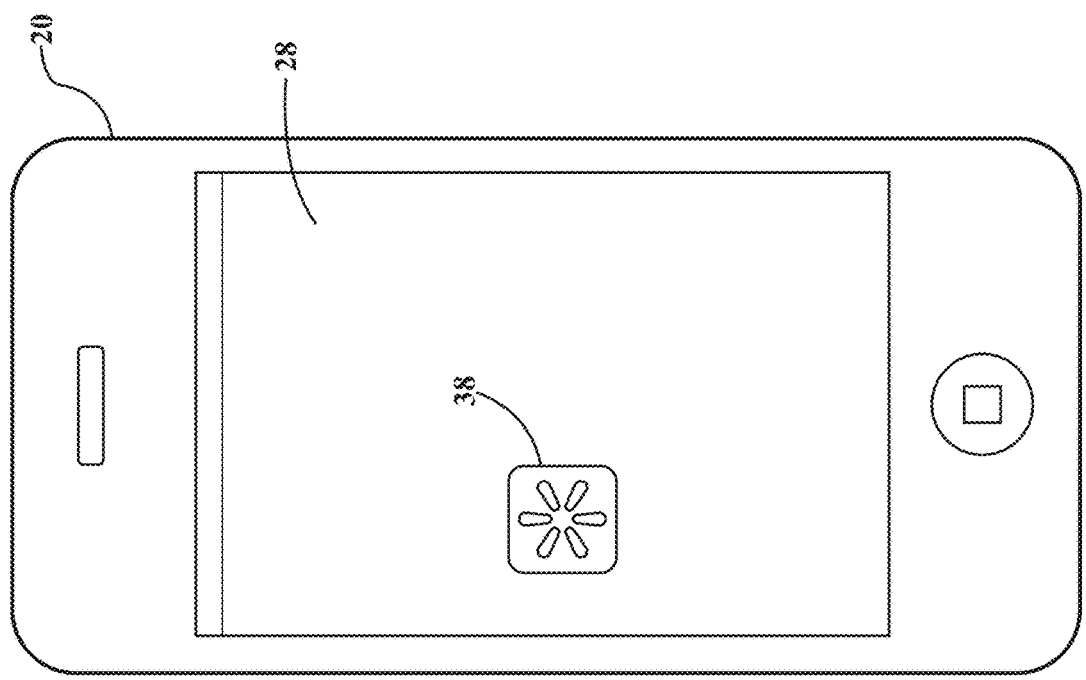

As shown in FIG. 3, the customer can access the customer application 18 on the customer mobile computing device 20 by locating and selecting (via, e.g., the touch of the customer's finger) an icon 38 present on the display or touchscreen 28 of the customer mobile computing device 20. In some instances, upon selecting the icon 38, the customer may be required to enter appropriate identification information into a login screen, such as a login name and password. Upon entering the appropriate identification information, the customer is automatically identified by the customer application 18. Alternatively, the customer's identification information may already be entered and stored such that when the customer application 18 is activated, the customer is already identified and can bypass the login screen.

Figure 4:
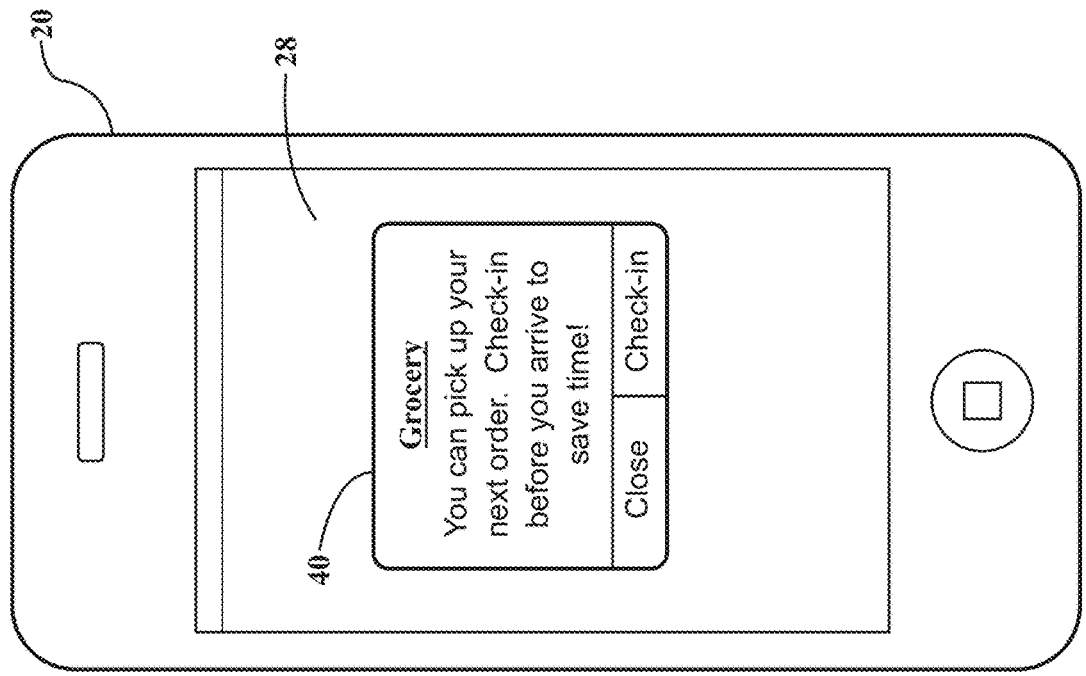
FIGS. 3-9 illustrate examples of different screens displayed on a touchscreen of a customer mobile computing device that are generated by a server computer of a store through a customer application resident on the customer mobile computing device.

Upon identifying the customer, the customer mobile computing device 20 (by instructions of the customer application 18 executed by the internal processor of the device 20) displays a home screen on the display or touchscreen 28 of the customer mobile computing device 20. In an example, the home screen may include a plurality of menu options, with one of the menu options including a Customer Order Pick-Up icon or button. Upon selecting a icon or button associated with customer order pick-up (such as by touching the icon or button utilizing the customer's finger), and as shown in FIG. 4, the customer application 18 may display a prompt 40 on the touchscreen 28 for enabling the customer to check-in. By selecting a "Check-In" button displayed at the bottom of the prompt 40, the customer has elected to check-in for picking up his/her customer order from the store 12. By checking-in, the server computer 14 can initiate filling the customer order so that the customer order is filled by the time the customer arrives at the store 12. The prompt 40 may also include a "Close" button that, when selected, the customer has elected not to check-in at that time. By not checking-in, the server computer 14 does not initiate filling the customer order. The customer can then wait until a later time to check-in.

Figure 5:
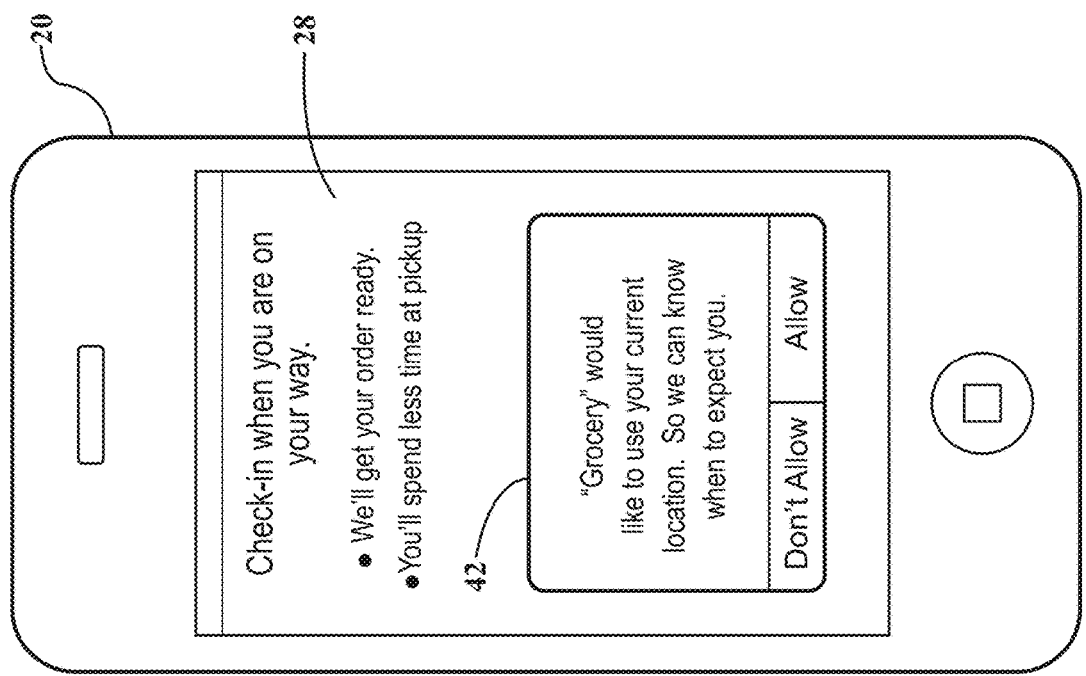

When the customer selects the "Check-In" button displayed on the touchscreen 28 as shown in FIG. 4, the customer application 18 displays a check-in screen on the touchscreen 28 including a prompt 42 inquiring whether or not the customer application 18 has permission use the current location of the customer mobile computing device 20. This is shown in FIG. 5. Said differently, the customer application 18 seeks permission or authorization from the customer to activate an internal GPS unit of the customer mobile computing device 20 to identify the current location of the customer mobile computing device 20. With permission, the customer application 18 can obtain and transmit signals to the server computer 14 including tracking information with the current location of the customer mobile computing device 20, typically until the customer (who is likely carrying the customer mobile computing device 20) arrives at the store 12.

In an embodiment, the customer gives permission to allow the server computer 14, through the customer application 18 to track the current location of the customer mobile computing device 20 by selecting the "Allow" button displayed at the bottom of the prompt 42, as shown in FIG. 5. Upon doing so, the mobile computing device 20 transmits, and server computer 14 receives from the customer mobile computing device 20 a signal including an indication that the server computer 14 is allowed or has permission to track the current location of the customer mobile computing device 20. If the customer does not desire to give permission to track the current location of the device 20, the customer can select the "Don't Allow" button displayed at the bottom of the prompt 42, as also shown in FIG. 5. Upon selecting the "Don't Allow" button, the customer application 18 does not allow the customer to check-in, and instead takes the customer back to the home screen. The home screen may include, for example, an icon or button enabling the customer to check-in, should the customer decide to check-in at a later time.

In an example, the prompt 42 shown in FIG. 5 may be presented to the customer each time the customer attempts to check-in to pick-up a customer order from the store. In another example, the prompt 42 may be presented for first time users, and once the customer has given permission to track the location of the device 20, the prompt 42 may be automatically bypassed each time the customer attempts to check-in for subsequent pick-up orders. Accordingly, upon checking-in (such as by selecting the "Check-In" button), the customer is automatically checked-in without the server computer 14 having to seek permission to track the location of the customer mobile computing device 20.

Figure 6:
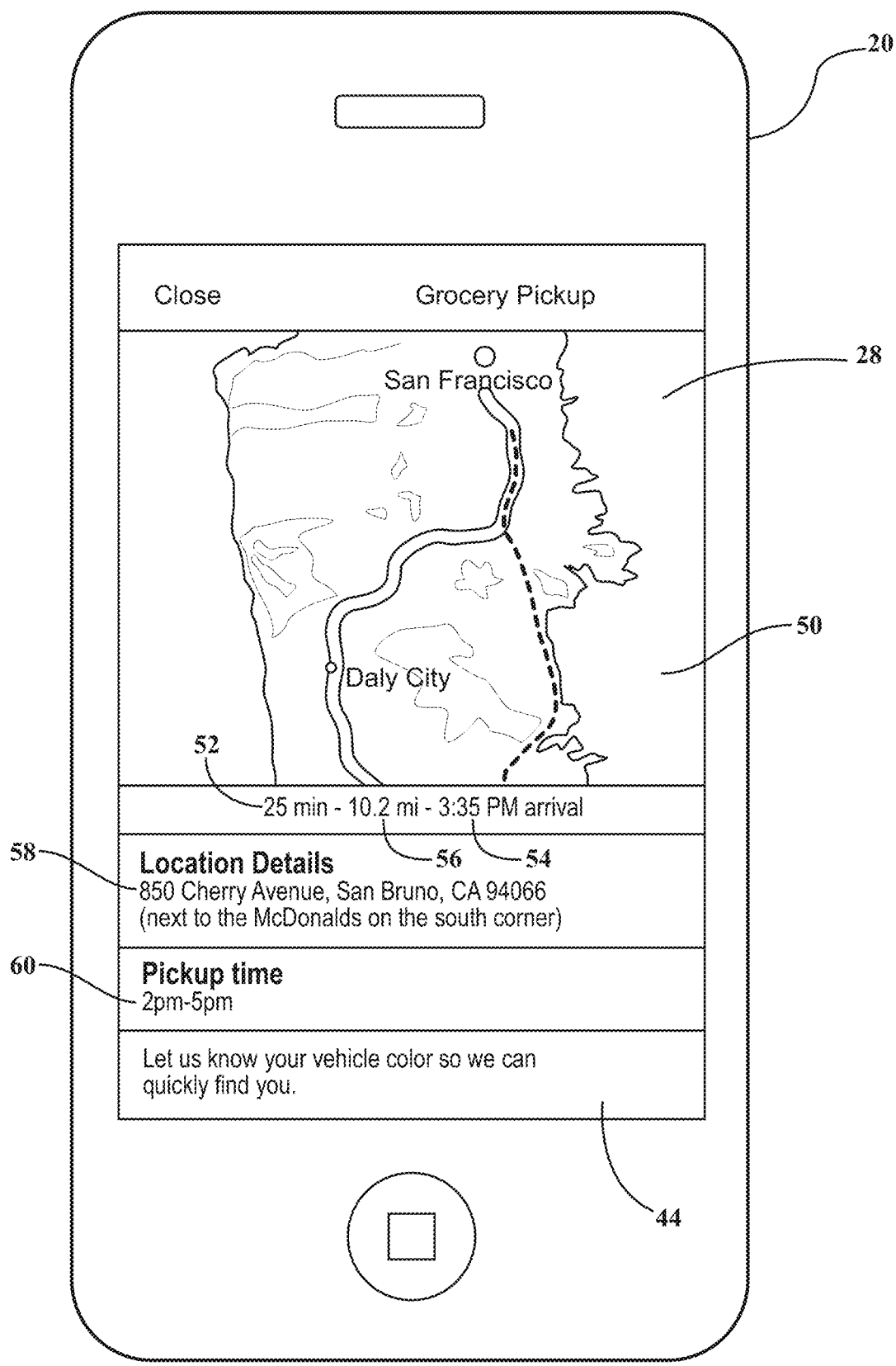

Once the customer has given permission for the server computer 14 to track the current location of the device 20, the customer application 18 presents a customer order pick-up screen, such as the screen shown in FIG. 6. As shown, the touchscreen 28 may display at least one of an interactive map 50 including vehicle route information (and upon activating the map, such as by touching the map with the customer's finger, the customer can access a map program that will provide detailed route information to the store 12), an approximate amount of time 52 until the customer arrives at the store, an approximate arrival time 54, a travel distance 56 to the store 12, an address 58 of the store, and a time-slot 60 for picking up the order. The screen shown in FIG. 6 further includes a button 44 that, when selected, enables the customer to select the color of the car or vehicle that the customer plans to use for traveling to the store 12 to pick-up the customer order. The store utilizes the vehicle color to quickly identify the customer as soon as he/she arrives so that the associate can promptly serve the customer.

Figure 7:
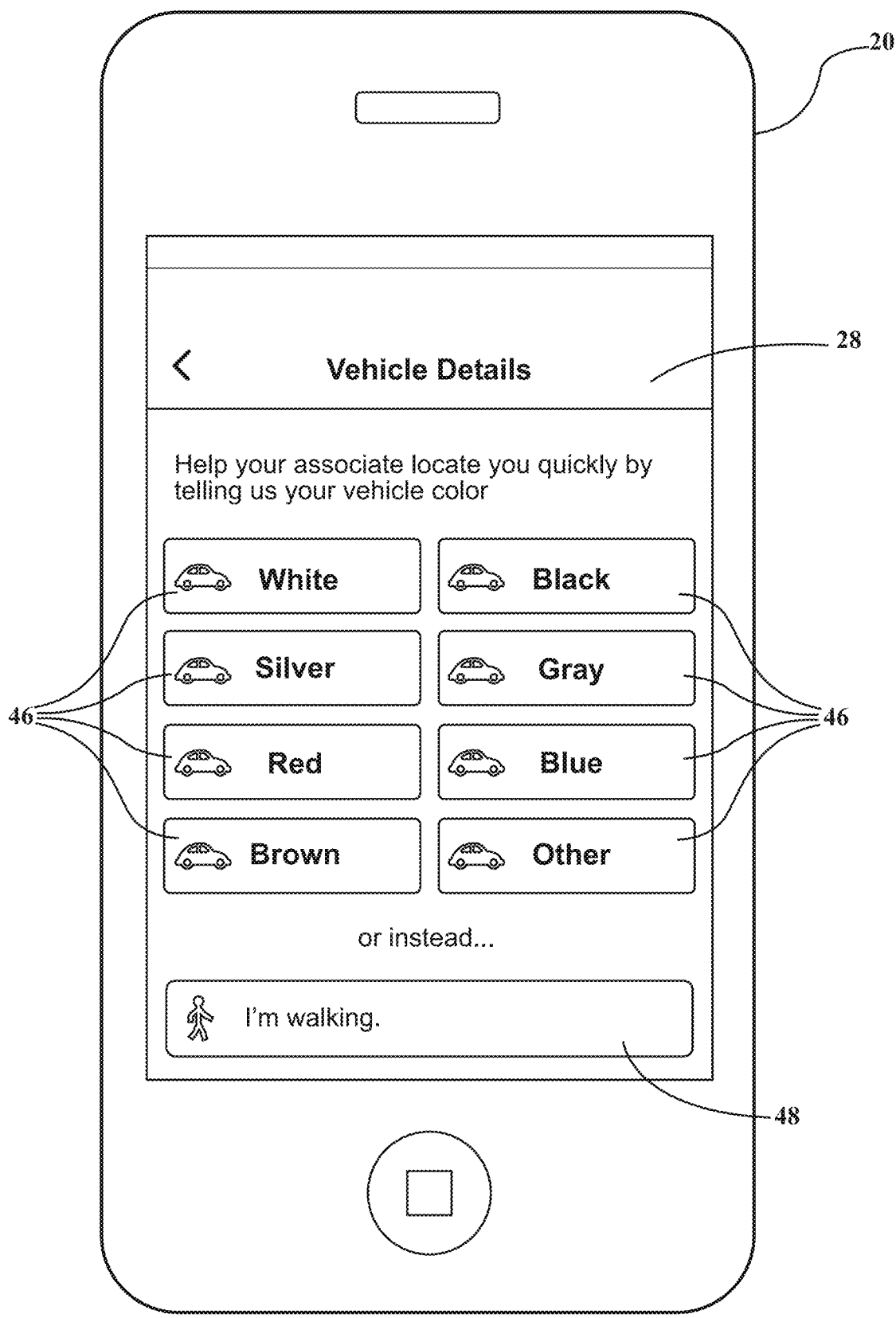

Upon selecting the button 44 displayed on the screen in FIG. 6, the server computer 14 (via the customer application 18) displays a Vehicle Details screen as shown in FIG. 7. The Vehicle Details screen a plurality of buttons 46, with each button 46 representing a different vehicle color (such as white, silver, red, brown, black, gray blue, and other). The screen shown in FIG. 7 also includes a button 48 indicating that the customer will be walking to the store to pick-up the order. The customer may select the button 48 in instances where the customer will not be driving a car to pick-up the customer order and, instead, will be walking or utilizing another form of transportation, such as a bicycle, rollerblades, a scooter, etc.

Figure 8:
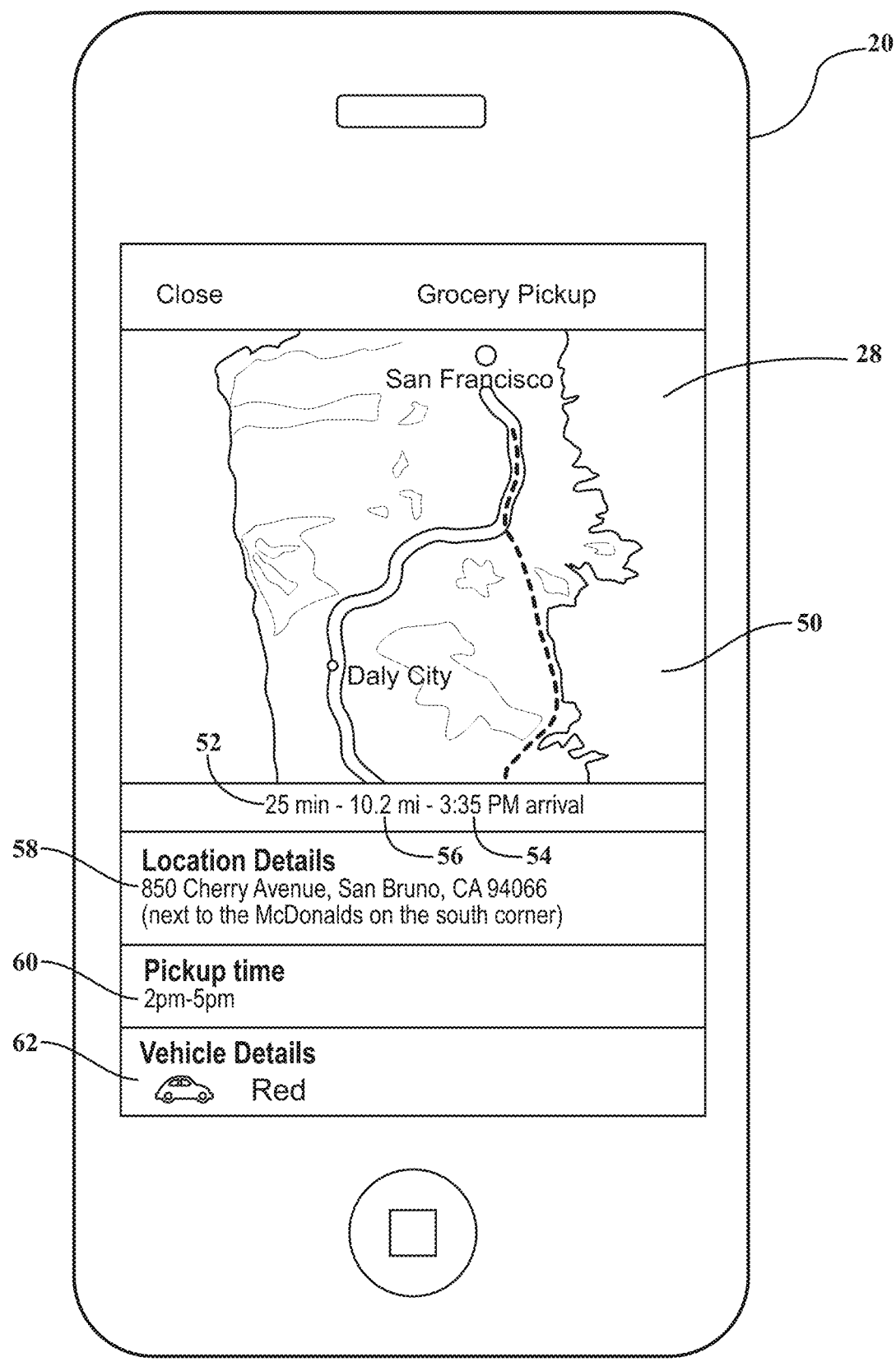

Upon selecting a vehicle color, the touchscreen 28 of the customer mobile computing device 20 displays the same information as previously displayed in FIG. 6 (including the interactive map 50 including vehicle route information, the approximate amount of time 52 until arrival at the store, the approximate arrival time 54, the travel distance 56 to the store 12, the address of the store 58, the time-slot 60 for picking up the order, and an icon 62 identifying a customer-selected color of the vehicle that the customer plans to use to pick-up the customer order, as shown in FIG. 8. In instances where the customer selects that he/she will be walking by selecting the button 48 on the touchscreen 28 shown in FIG. 7, then the touchscreen 28 of the customer mobile computing device 20 displays the interactive map including vehicle route information, the approximate amount of time until arrival at the store, the approximate arrival time, the travel distance to the store, the address of the store, the time-slot for picking up the order and an icon identifying a customer-selected preference to walk to the store to pick-up the customer order.

It is to be understood that the customer is not required to pick a vehicle color, and therefore does not have to select the button 48 that leads to the Vehicle Details screen shown in FIG. 7 for picking the vehicle color. Without selecting a vehicle color, the touchscreen 28 of the customer mobile computing device 20 displays just the interactive map including vehicle route information, the approximate amount of time until arrival at the store, the approximate arrival time, the travel distance to the store, the address of the store, and the time-slot for picking up the order, as shown in FIG. 6.

In an embodiment, the server computer 14 automatically selects a time slot for pick-up of the customer order by the customer. This time slot 60 is displayed on the touchscreen 28, as shown, e.g., in FIG. 6. In another embodiment, the customer utilizes the customer application 18 to select a time slot. The time slot may be selected, by the customer, at any time prior to checking-in. For instance, the customer may access the home screen utilizing the customer application 18 on the customer mobile computing device 20, access the customer order pick-up option from the menu, and select a (or change a previously-selected) time slot for picking up a customer order. The time slot may be selected or changed, for example, by selecting a time slot from a menu, such as a drop-down menu displayed on the touchscreen 28 containing a plurality of time slots. Alternatively, the time slot may be changed, for example, by enabling the customer input a customer-selected time slot, such as by typing (using a keypad displayed on the touchscreen 28) or dictating (by speaking into a microphone of the customer mobile computing device 20) the customer-preferred time slot into the customer mobile computing device 20. Once the customer has selected a time slot and saved it, the customer-selected time slot is transmitted from the device 20 to the server computer 14, where the customer-selected time slot is associated with the customer order and stored in the database 16. In an alternative embodiment, the customer application 18 may include a separate screen prompting the customer to select a time slot for pick-up of the customer order. This screen may, for example, be presented to the customer on the touchscreen 28 prior to the check-in screen shown in FIG. 4.

In an embodiment, the customer application 18 may display, on the touchscreen 28 of the customer mobile computing device 20, at least one notification to the customer that the customer-selected time slot is approaching. For example, the customer application 18 may display a prompt on the touchscreen 28 indicating to the customer that check-in time is 1 hour away, 30 minutes away, 15 minutes away, 5 minutes away, etc. The customer application 18 may also display at least one notification to the customer to check-in once the time slot begins if the customer has not yet checked-in. For instance, the customer application 18 may periodically display a notification to the customer reminding the customer to check-in after the beginning of the time slot in instances where the customer has not checked-in yet.

Once the customer has checked-in and made his/her selections utilizing the customer application 18, the customer mobile computing device 20 transmits to the server computer 14 a signal including the unique customer identification associated with the customer mobile computing device 20, an indication that the customer has checked-in to pick-up the customer order from the store, and a customer-selected time slot for picking up the customer order from the store. In instances where the customer selected a vehicle color or a preference to walk, the vehicle color or preference to walk is also transmitted from the customer mobile computing device 20 to the server computer 14.

Figure 9:
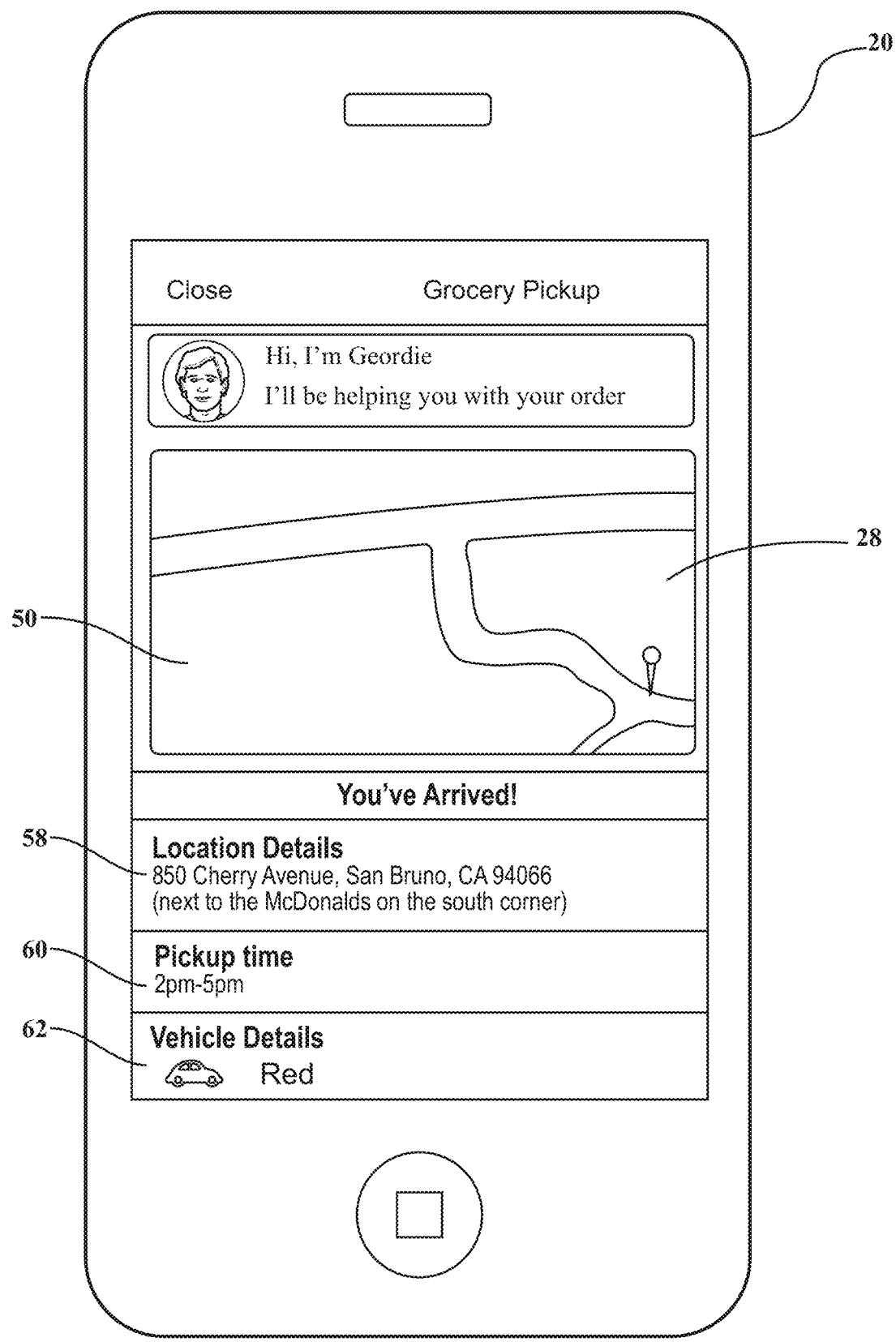

Upon receiving the transmission from the customer mobile computing device 20, the server computer 14 transmits a signal to the associate mobile computing device 24 of one of the associates at the store including an indication that the customer has checked-in. In an embodiment, the transmission is sent from the server computer 14 to the associate mobile computing device 24 of each of the associates at the store with an offer to the associate to serve the customer. One of the associates may accept the offer by sending an acceptance transmission from his/her associate mobile computing device 24 to the server computer 14. The acceptance transmission may include an identification of a store location and an identification of the associate available to fill the customer order. In another embodiment, the associate available to fill the customer order is preselected, e.g., by manager of the store or by the server computer 14 based on availability of associates during the time slot for pick-up. In this embodiment, the server computer 14 transmits the signal directly to the associate mobile computing device 24 of the preselected associate that the customer has checked-in. Once an associate has been selected, the server computer 14 transmits a signal to the customer mobile computing device 20 including an identification of the associate at the store who is filling the customer order, as shown in FIG. 9.

In addition, once the customer has checked-in, the server computer 14 retrieves one of the data records from the database 16 including the customer order information associated with the unique customer identification, which is associated with the customer mobile computing device 20. The server computer 14 then transmits a signal to the associate mobile computing device 24 including the retrieved data record containing the customer order information so the associate can begin filling the customer order, such as by retrieving items of the customer order from the shelves of the store 12 or shop.

After the customer has checked-in, and during the time slot, the server computer 14 obtains tracking information of the current location of the customer mobile computing device 20. Utilizing the internal GPS unit of the customer mobile computing device 20, the customer application 18 continuously records the current location of the customer mobile computing device 20 as the customer (who has the customer mobile computing device 20 with him/her, such as on his/her person or in the car with the customer) as the customer is traveling. The customer mobile computing device 20 continuously transmits signals to the server computer 14 including the recorded location of the customer mobile computing device 20 as the customer is traveling so that the server computer 14 can track the location of the customer. The server computer 14 utilizes the tracking information to identify the customer's current position, in what direction the customer is traveling, and how fast the customer is traveling. The tracking information is used, by the server computer 14, to estimate an arrival time, a distance between the current location of the customer (i.e., the current location of the customer mobile computing device 20) and the location of the store 12, and an amount of travel time remaining until the customer (with the customer mobile computing device 20) arrives at the store 12.

Figure 10:
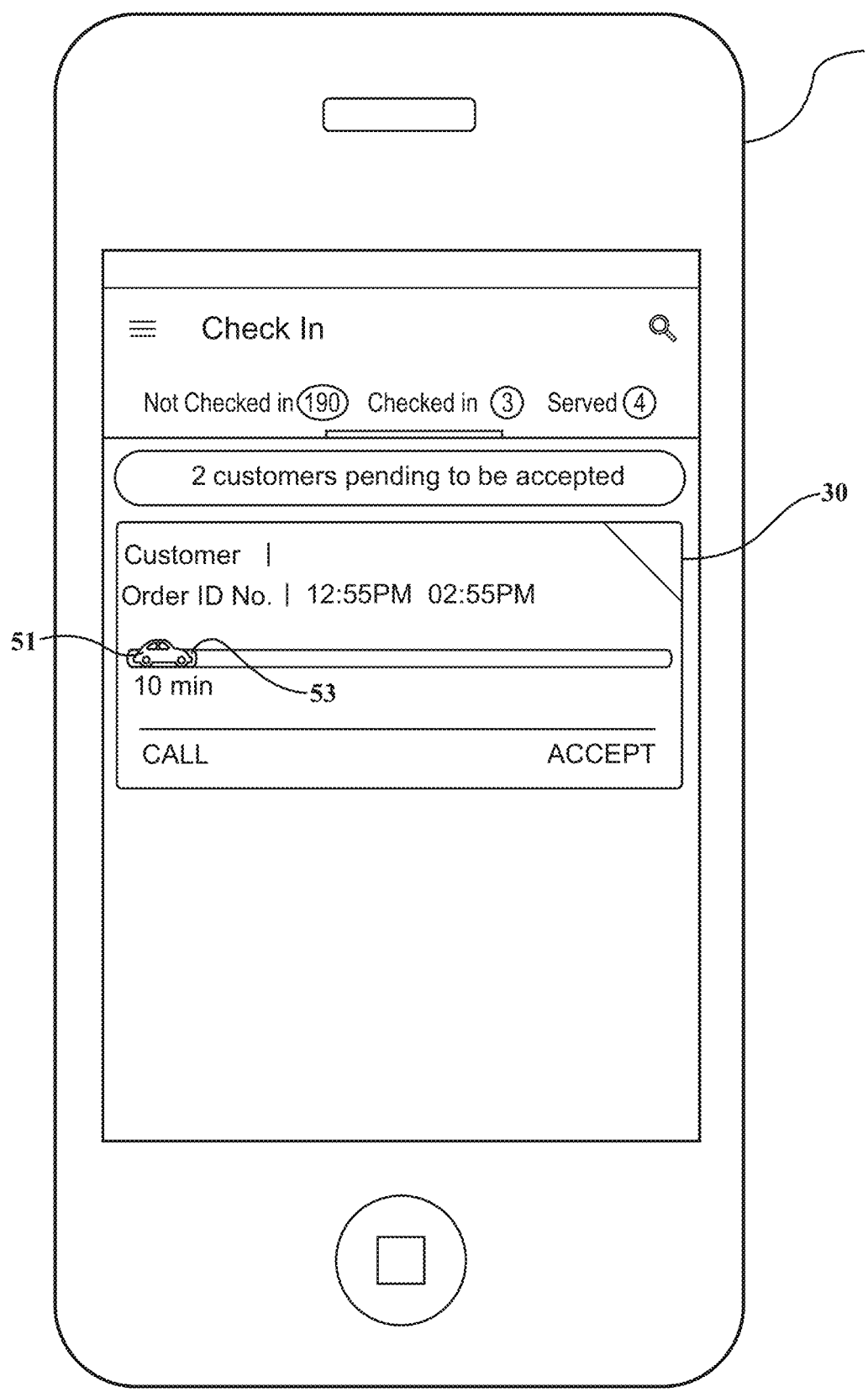
FIGS. 10-13 illustrate examples of different screens displayed on a touchscreen of an associate mobile computing device that are generated by a server computer of a store through an associate application resident on the associate mobile computing device.

Once the server computer 14 determines a travel time remaining until the customer arrives at the store 12 (utilizing the tracking information), the server computer 14 transmits a signal to the associate mobile computing device 24 including the unique customer identification (which is linked to the customer mobile computing device 20) and a first estimated travel time remaining until the customer mobile computing device 20 associated with the unique customer identification arrives at the store. The server computer 14 also transmits a signal to the associate mobile computing device 24 including an instruction to display (utilizing the associate application 22) the first travel time remaining along with a graphical representation on the touchscreen 30 of the associate mobile computing device 24. As shown in FIG. 10, the graphical representation of the travel time remaining displayed on the touchscreen 30 of the associate mobile computing device 24 includes an icon 51 that is moveable across the touchscreen 30 along a bar 53. In an embodiment, the bar 53 has a changeable length that is representative of the estimated amount of travel time remaining until the customer mobile computing device 20 arrives at the store. While the icon 51 is shown in FIG. 10 as a car, any icon can be used, such as a truck, boat, airplane, bicycle, person, mobile cellular phone, etc. In addition, where the customer has selected the vehicle color, the icon 51 may be shown as having the customer-selected vehicle color. For example, if the customer selected the vehicle color red, then the icon 51 would have the color red when displayed on the touchscreen 30 of the associate mobile computing device 24. In another example, if the customer selected that he/she will be walking, then the icon 51 may be represented as a person walking when displayed on the touchscreen 30 of the associate mobile computing device 24. Furthermore, the amount of travel time remaining is displayed under the icon 51. As shown in FIG. 10, for example, the amount of travel time remaining of 10 minutes (i.e., the customer should be arriving at the store in 10 minutes) is displayed under the icon (car) 51.

As previously mentioned, the customer mobile computing device 20 continuously transmits signals to the server computer 14 including the recorded location of the customer mobile computing device 20 as the customer is traveling so that the server computer 14 can track the location of the customer. In turn, the server computer 14 utilizes these signals to dynamically update the amount of travel time remaining until the customer arrives at the store, and transmits the updated estimated amount of travel time remaining to the associate mobile computing device 24. The server computer 14 also transmits a signal to the associate mobile computing device 24 to display a graphical representation of the updated estimated amount of travel time remaining on the touchscreen 30 of the associate mobile computing device 24. In an example, and as described above, the first estimated travel time remaining is displayed as both an alphanumeric and graphical representation on the touchscreen 30 of the associate mobile computing device 24. As shown in FIG. 10, the icon 51 and bar 53 (graphical representation) and the travel time remaining (alphanumeric representation) are positioned at the left-hand-side of the touchscreen 30, indicating a starting point of the customer's travels (i.e., the initial location of the customer mobile computing device 20). In the example shown in FIG. 10, the initial location of the customer mobile computing device 20 is about 10 minutes away from the store. It is to be understood that the initial location of the mobile computing device 20 can be any amount of time away, and the starting point of the customer's travels will be reflected on the associate mobile computing device 24. For instance, if the starting point of the customer's travels is about 25 minutes away, then the travel time remaining, as an alphanumeric representation) will be displayed on the touchscreen 30 of the associate mobile computing device 20 as the starting point on the left-hand-side of the screen. It is also be to understood that the starting point can be anywhere on the touchscreen, such as on the right-hand-side of the screen such that the icon 51 moves from right to left, on the top of the screen such that the icon 51 moves from top to bottom, at the corner of the screen such that the icon 51 moves from that corner and diagonally to the opposite corner, etc.

Figure 11:
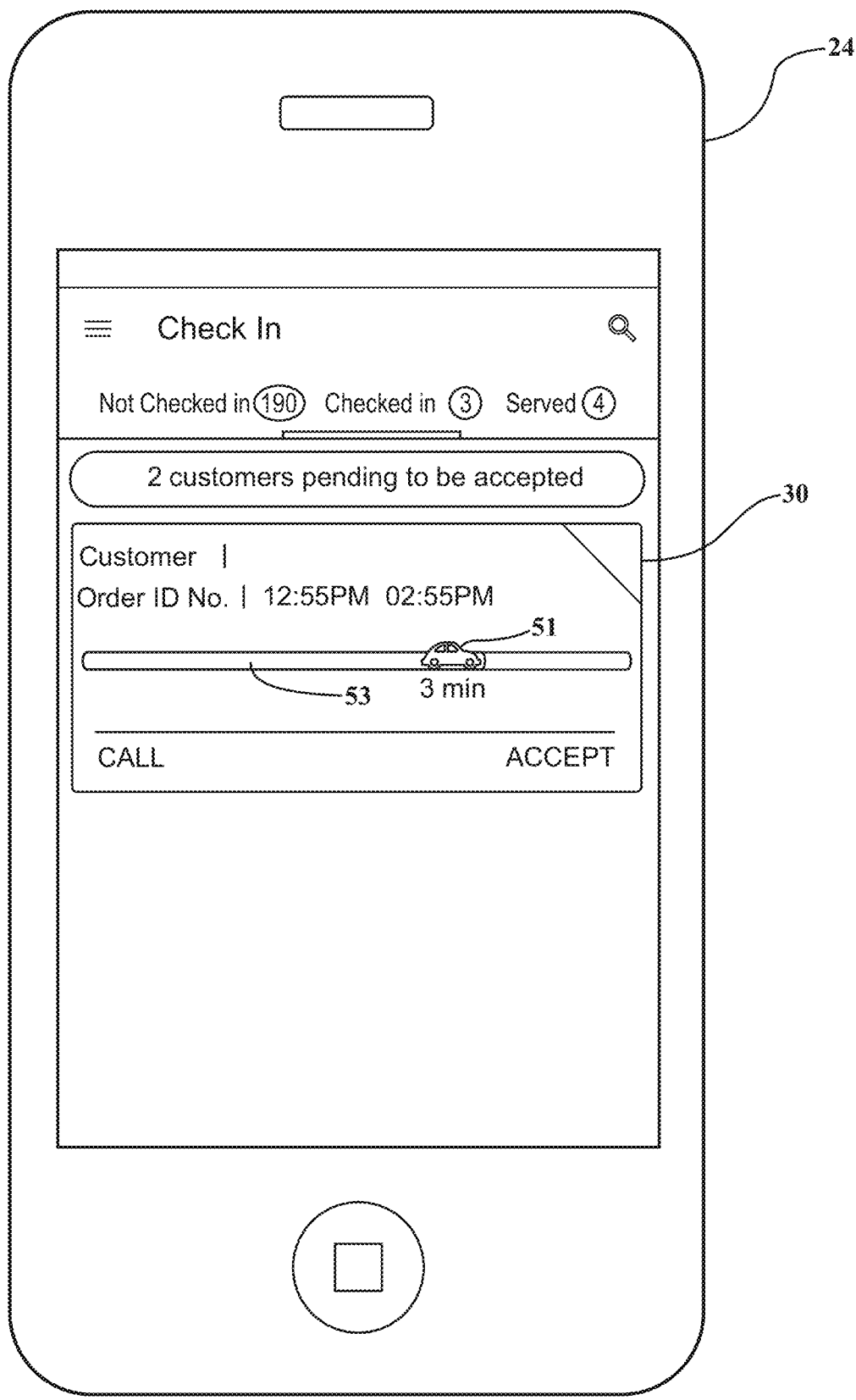
Figure 12:
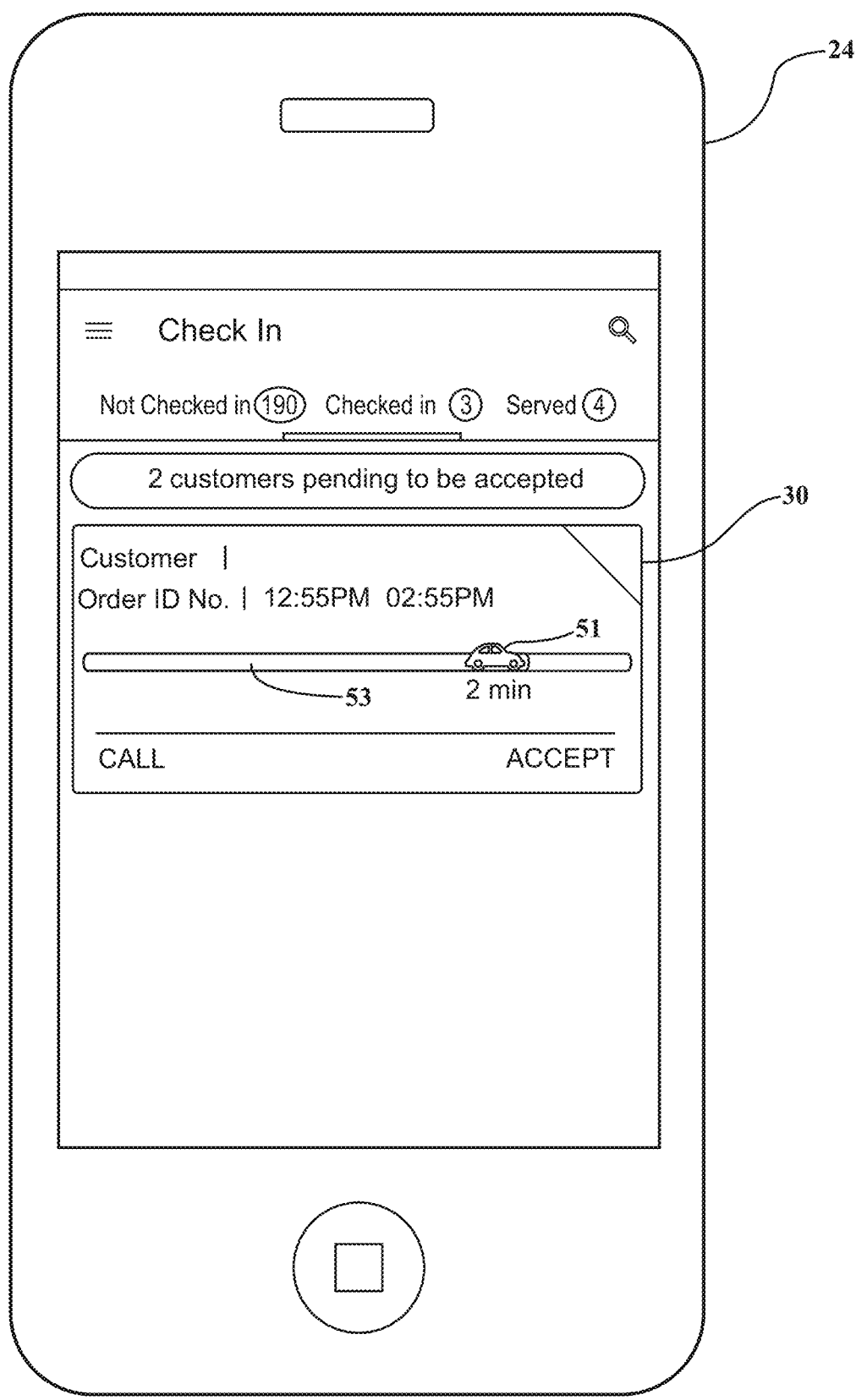

As the customer travels toward the store, the amount of travel time remaining until the customer arrives at the store 12 is reduced. The server computer 14 can determine, utilizing the tracking information of the customer mobile computing device 20, that the customer is moving toward the store 12, and can also utilize the tracking information to estimate an updated travel time remaining until the customer arrives at the store 12. This updated remaining travel time is transmitted to the associate mobile computing device 24, by the server computer 14, with an instruction to display a graphical representation of the updated remaining travel time on the touchscreen 30 of the associate mobile computing device 24. An example of this is shown in FIG. 11, where the icon 51 (car) and the bar 53 has moved toward the right-hand-side of the screen from the starting point (at the left-hand-side of the screen), and the alphanumeric representation of the time remaining (3 minutes) is displayed below the icon 51.

Figure 13:
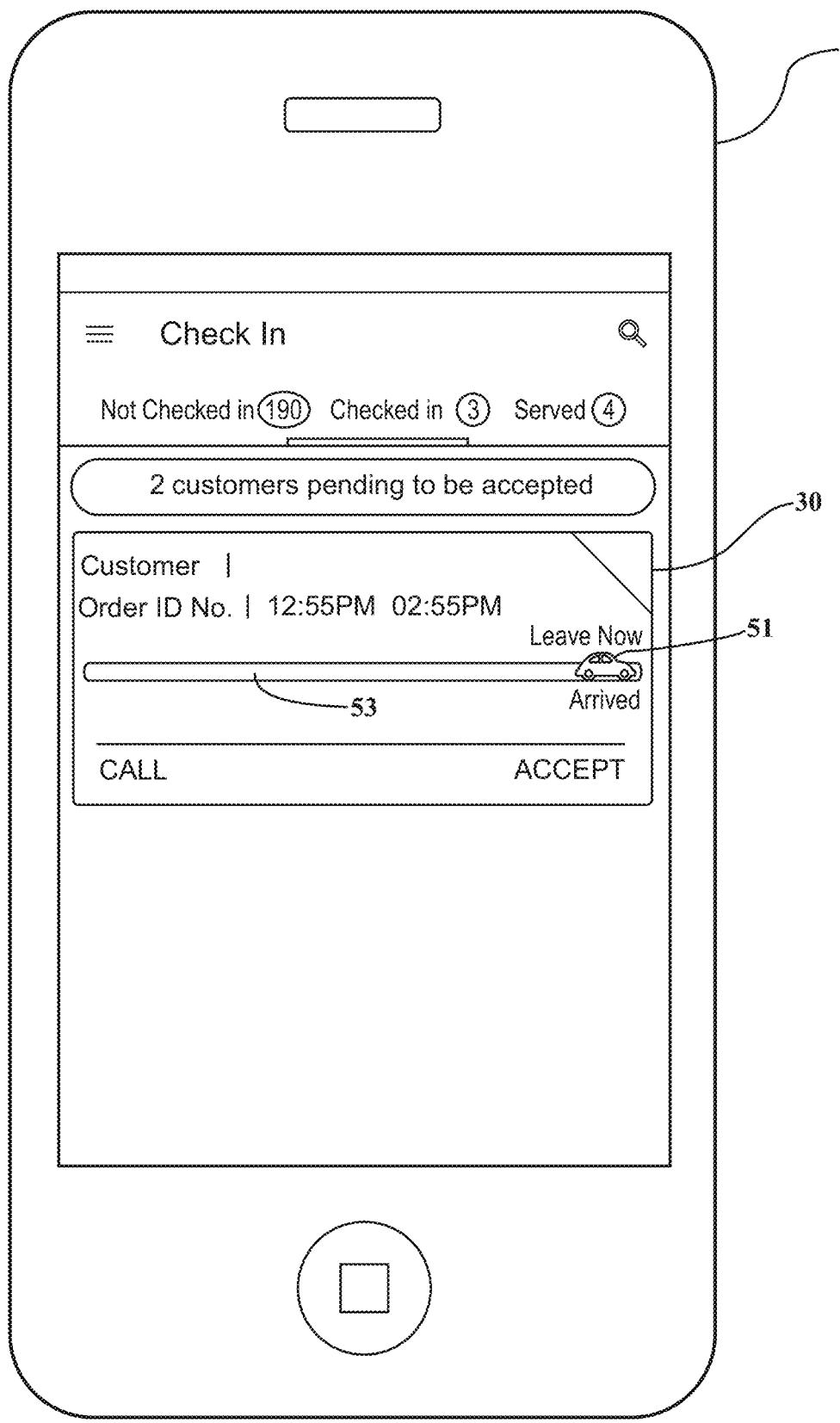

In an embodiment, the server computer 14 continuously obtains the tracking information from the customer mobile computing device 20, continuously updates the estimated remaining travel time, and continuously transmits signals to the associate mobile computing device 24 with instructions to display the updated remaining travel time. For example, and as shown in FIG. 11 and as previously described, the associate mobile computing device 14 displays the updated remaining travel time of 3 minutes until the customer arrives at the store, and the icon (car) 51 has moved and bar 53 has extended from the left-hand-side of the touchscreen 30 to a position closer to the right-hand-side of the touchscreen 30. By continuously receiving updated remaining travel time from the server computer 14, the associate mobile computing device 24 continuously displays the updated travel time on the touchscreen 30. For example, in FIG. 12, the associate mobile computing device 14 displays a further updated remaining travel time of 2 minutes until the customer arrives at the store, and the icon (car) 51 has moved and bar 53 has extended to a position that is even closer to the right-hand-side of the touchscreen 30 than that shown in FIG. 11. The server computer 14 transmits the updated remaining travel time to the associate mobile computing device 24 until the customer mobile computing device 20 has arrived at the store, which is shown by the icon (car) 51 being moved to the right-hand-side of the touchscreen 30 and the bar 53 extending across the touchscreen 30 from the left-hand-side to the right-hand-side, as shown in FIG. 13.

Typically, the updated remaining travel time is updated each time the server computer 14 transmits a new signal to the associate mobile computing device 20 with updated information. In another example, the updated remaining travel time may be updated dynamically, where information taken from the customer mobile computing device 20 is transmitted immediately to the associate mobile computing device 24 so that the remaining travel time is reflected on the touchscreen 30 of the associate device 24 in real time.

In an embodiment, the tracking information received by the server computer 14 may reveal that the customer mobile computing device 20 is moving in a direction away from the store 12. This may occur, for example, when the customer has decided to go back home, when the customer takes a detour to another point of interest before arriving at the store 12, or the like. In some instances, the customer may be stuck in traffic even though the customer is still heading in the direction toward the store 12, and it appears that the customer mobile computing device 20 is not moving. In any of these scenarios, the updated travel time remaining may be longer than what the estimated travel time remaining was to begin with. Accordingly, and in this embodiment, the server computer 14 utilizes the tracking information to determine that the customer mobile computing device 20 is moving away from the store or is not moving at all, and transmits a signal to the device 24 indicating that the customer associate with the customer mobile computing device 20 is no longer moving toward the store. In an example, the server computer 14 also transmits a signal including an instruction to change the graphical representation, such as the icon (car) 51 displayed on the touchscreen 30, as being positioned further away from the right-hand-side of the touchscreen 30 than the icon 51 was previously positioned. Likewise, the bar 53 may shrink in length (e.g., appear shorter than the bar 53 was before). In instances where the server computer 14 determines that the customer has gone back home, is not moving, and/or heading toward a different point of interest, the server computer 14 may transmit a signal to the associate mobile computing device 24 indicating that the customer is no longer moving toward the store. The server computer 14 may also transmit a signal including instructions to the associate to place the items of the customer order, e.g., back on the shelves of the store, as the customer is likely not going to timely show up to pick-up his/her order.

When the customer arrives at the store, the server computer 14 transmits another signal to the associate mobile computing device 14 indicating that the customer mobile computing device 20 has arrived and transmits an instruction to display the same on the associate mobile computing device 24. For example, and as shown in FIG. 13, the term "Arrived" is displayed on the touchscreen 30 of the associate device 24 below the icon 51. In addition, the server computer 14 may also transmit a signal to the associate mobile computing device 24 with a notification to the associate to proceed with serving the customer who has arrived. As shown in FIG. 13, the term "Leave Now" may also be displayed on the touchscreen 30 above the icon 51.

Once the customer has arrived, the server computer 14 may also transmit a signal to the associate mobile computing device 24 to display, on the touchscreen 30, a prompt inquiring whether or not the associate would like to mark the customer order as being served. Where the associate has retrieved all of the items of the customer order and the order is ready for pick-up upon arrival of the customer at the store, the associate may select "Yes" indicating that the customer has been served. In this instance, the associate mobile computing device 24 transmits a signal to the server computer 14 indicating that the customer has been served. Where the associate has not yet retrieved all of the items of the customer order, the associate may select "No" indicating that the customer has not yet been served. While the prompt may be displayed on the associate mobile computing device 24 once the customer has arrived at the store, the prompt may also be displayed at any time prior to the customer's arrival.

In an embodiment, and as shown in FIGS. 10-13, the server computer 14 may transmit a signal to the associate mobile computing device 24 to update a running total of the number of customers that have checked-in, the number of customers with pending orders who have not checked-in, and the number of customers that have been served. The unique customer identification for each of the customers with pending orders falling within a particular time slot may be displayed on the associate mobile computing device 24. In an example, the customers who have checked-in are displayed at the top, and the customer who have not checked-in are displayed at the bottom. In another embodiment, and as shown in FIGS. 10-13, the server computer 14 may transmit a signal to the associate mobile computing device 24 including an instruction to display the number of customers waiting for an associate to accept an offer to serve the customer. In this way, the associate is aware that customers have checked-in and are on their way to the store, but none of the associates are yet responsible for filling the customer orders. Utilizing the alphanumeric and graphical representation of the travel time remaining until the customer arrives at the store, an associate may accept one or more of the pending customers so that those customer orders are filled by the time the customers arrive at the store.

In another embodiment, and as shown in FIGS. 10-13, the touchscreen 30 of the associate mobile computing device 24 may include a "call" icon associated with each of the customers (identified by the unique customer identification) who has checked-in and is displayed on the touchscreen 30. The "call" icon may be used, by the associate utilizing his/her associate mobile computing device 24, to contact the customer in instances where the associate has questions regarding the customer order, questions regarding where the customer is located at the store for purposes of delivering the customer order to the customer or customer's vehicle, and/or the like. In an example, the "call" icon is linked to the customer's cellular phone number, and when selected by the associate, automatically places a phone call to the customer's mobile computing device 20. Once the customer has arrived, the associate can deliver the order directly to the customer by handing the items of the customer order to the customer who is inside the store or delivering the items to the customer's vehicle in, e.g., the parking lot of the store.

Figure 14:
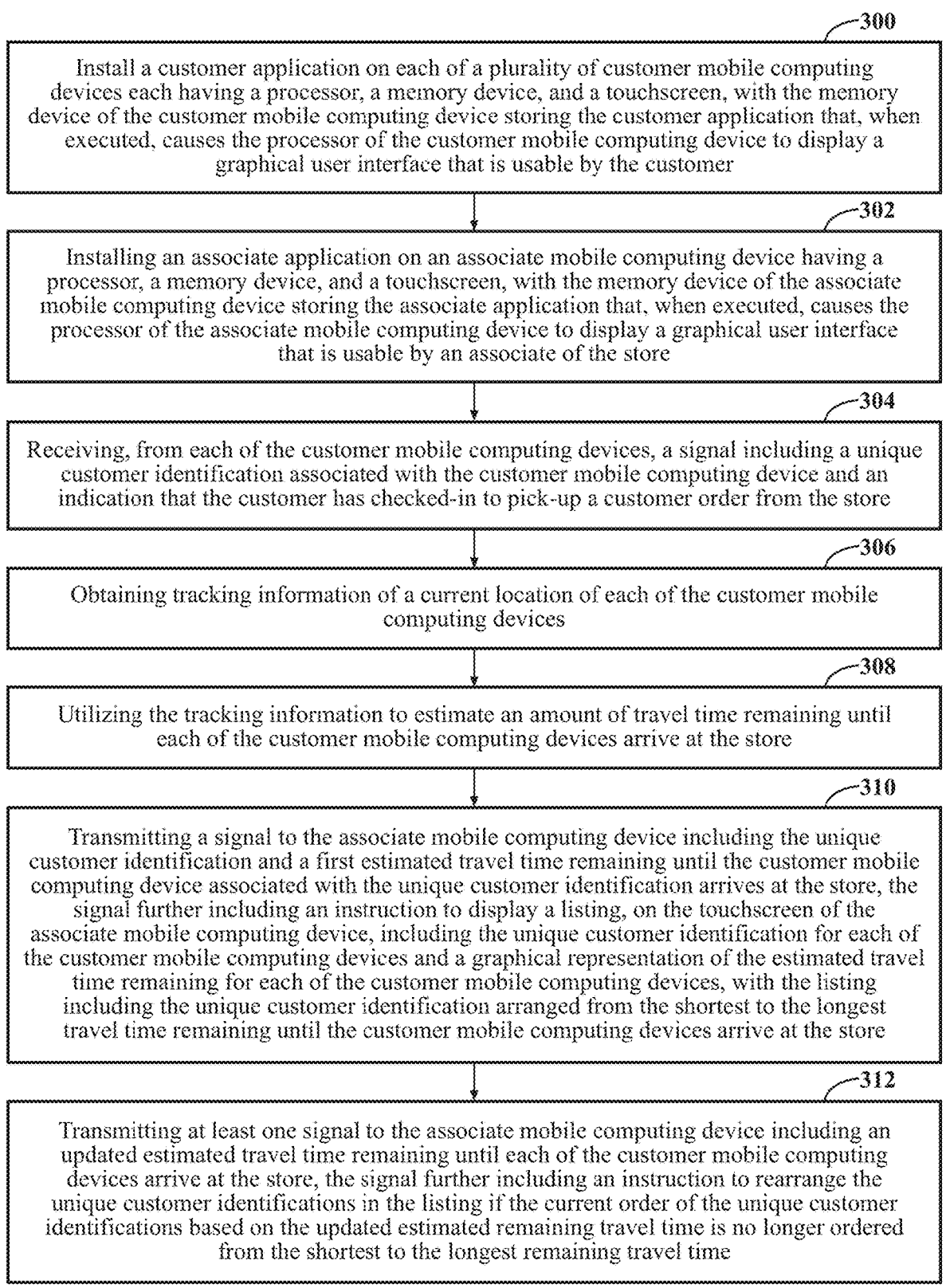
FIG. 14 is a flow diagram illustrating another embodiment of a method for checking-in a customer.

Referring now to FIG. 14, another embodiment of a customer check-in method is described below. The method utilizes the processor of the server computer 14 to perform the steps of: install a customer application on each of a plurality of customer mobile computing devices each having a processor, a memory device, and a touchscreen, with the memory device of the customer mobile computing device storing the customer application that, when executed, causes the processor of the customer mobile computing device to display a graphical user interface that is usable by the customer (as shown in step 300); install an associate application on an associate mobile computing device having a processor, a memory device, and a touchscreen, with the memory device of the associate mobile computing device storing the associate application that, when executed, causes the processor of the associate mobile computing device to display a graphical user interface that is usable by an associate of the store (as shown in step 302); receive, from each of the customer mobile computing devices, a signal including a unique customer identification associated with the customer mobile computing device and an indication that the customer has checked-in to pick-up a customer order from the store (as shown in step 304); obtain tracking information of a current location of each of the customer mobile computing devices (as shown in step 306); utilize the tracking information to estimate an amount of travel time remaining until each of the customer mobile computing devices arrive at the store (as shown in step 308); transmit a signal to the associate mobile computing device including the unique customer identification and a first estimated travel time remaining until the customer mobile computing device associated with the unique customer identification arrives at the store, the signal further including an instruction to display a listing, on the touchscreen of the associate mobile computing device, including the unique customer identification for each of the customer mobile computing devices and a graphical representation of the estimated travel time remaining for each of the customer mobile computing devices, with the listing including the unique customer identification arranged from the shortest to the longest travel time remaining until the customer mobile computing devices arrive at the store (as shown in step 310); and transmit at least one signal to the associate mobile computing device including an updated estimated travel time remaining until each of the customer mobile computing devices arrives at the store, the signal further including an instruction to rearrange the unique customer identifications in the listing if the current order of the unique customer identifications based on the updated estimated remaining travel time is no longer ordered from the shortest to the longest remaining travel time (as shown in step 312). Details of this embodiment of the method are described below with reference to FIGS. 15-18.

The present embodiment of the method illustrated in FIG. 14 is similar to the embodiment of the method illustrated in FIG. 2, except that the present embodiment takes into account a plurality of customers who have checked-in for picking up respective customer orders from the store 12. Steps 300-308 are similar to steps 200-208 as described above. However, in the present method, the server computer 14 transmits, to the associate mobile computing device 24, the unique customer identification and a first estimated travel time remaining for each of the plurality of customers until each of the customer mobile computing devices 20 arrive at the store 12. The signal also includes an instruction to display a listing, on the touchscreen 30 of the associate mobile computing device 24, including the unique customer identification and a graphical representation of the estimated travel time remaining for each of the customer mobile computing devices 20.

In an embodiment, the listing displayed on the touchscreen 30 of the associate mobile computing device 24 includes the unique customer identification arranged from the shortest (arranged at the top) to the longest (arranged at the bottom) travel time remaining until the customer mobile computing devices 20 arrive at the store. In the example shown in FIG. 15, Customer 1 and Customer 2 have checked-in, and the travel time remaining until Customer 1 arrives at the store is about 3 minutes and the travel time remaining until Customer 2 arrives at the store is about 10 minutes. As shown in FIG. 14, Customer 1 is arranged at the top of the touchscreen 30, and Customer 2 is arranged under Customer because Customer 2 has a longer travel time remaining than Customer 1.

Figure 15:
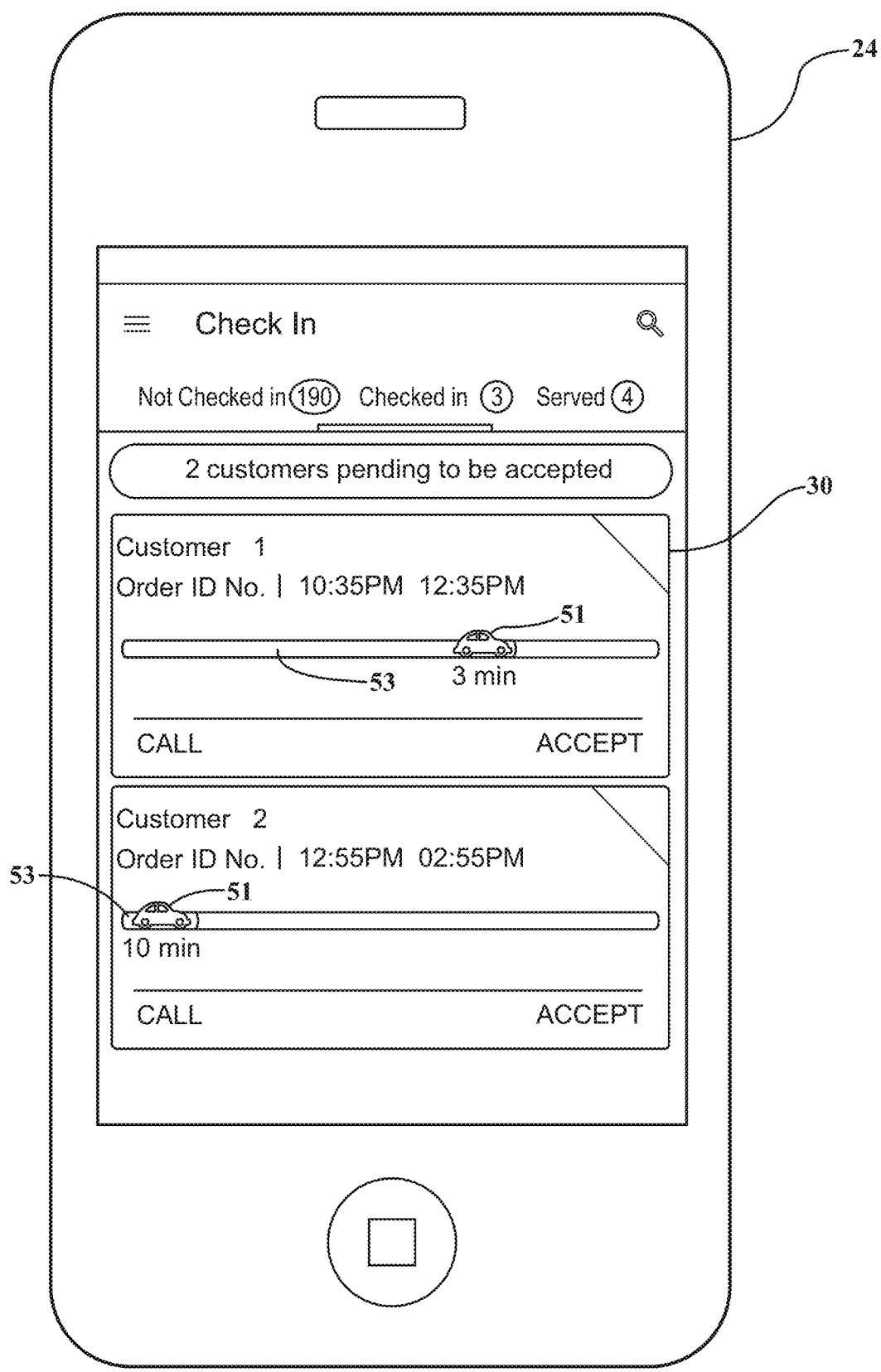
FIGS. 15-19 illustrate further examples of different screens displayed on a touchscreen of an associate mobile computing device that are generated by the server computer at the store through an associate application resident on the associate mobile computing device.

As previously described, the customer mobile computing device 20 continuously transmits signals to the server computer 14 including the recorded location of the customer mobile computing device 20 as the customer is traveling so that the server computer 14 can track the location of the customer. In turn, the server computer 14 utilizes these signals to update the amount of travel time remaining until the customer arrives at the store 12, and transmits the updated estimated amount of travel time remaining to the associate mobile computing device 24. In this present embodiment, an updated estimated amount of travel time remaining for each customer that has checked-in is transmitted to the associate mobile computing device 24. The server computer 14 also transmits a signal to the associate mobile computing device 24 to display a graphical representation of the updated estimated amount of travel time remaining for each customer on the touchscreen 30 of the associate mobile computing device 24. In an example, the first estimated travel time remaining is displayed as both an alphanumeric and graphical representation on the touchscreen 30 of the associate mobile computing device 24. As shown in FIG. 15, the icon 51 and bar 53 (graphical representation) and the travel time remaining (alphanumeric representation) for Customer 2 are positioned at the left-hand-side of the touchscreen 30, indicating a starting point of Customer 2's travels (i.e., the initial location of the customer mobile computing device 20 of Customer 2). In the example shown in FIG. 15, the initial location of the customer mobile computing device 20 of Customer 2 is about 10 minutes away from the store.

Figure 16:
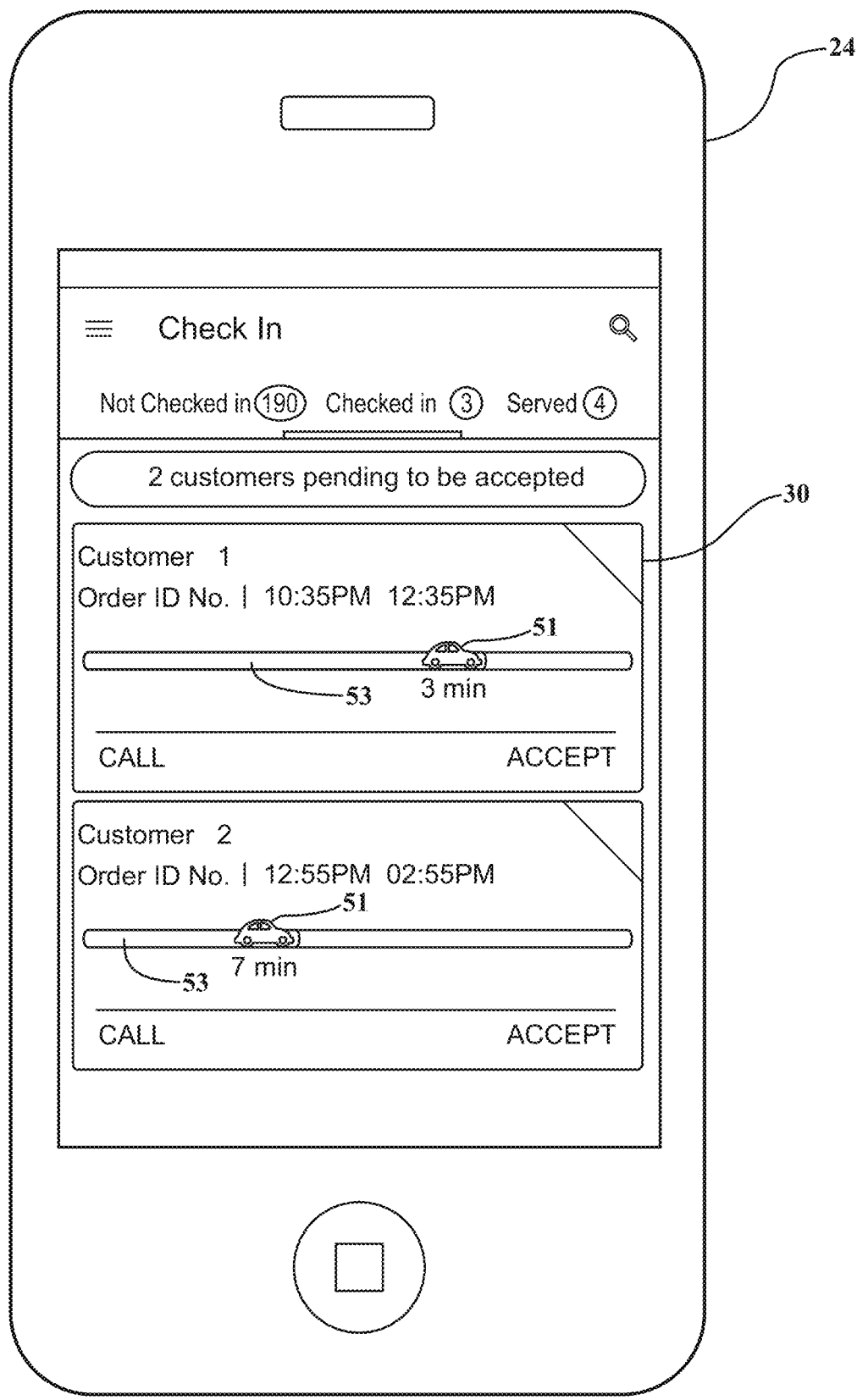

As Customer 2 travels toward the store, the amount of travel time remaining until Customer 2 arrives at the store is reduced. The server computer 14 can determine, utilizing the tracking information of the customer mobile computing device 14, that Customer 2 is moving toward the store, and can also utilize the tracking information to estimate an updated travel time remaining until Customer 2 arrives at the store. This updated remaining travel time is transmitted to the associate mobile computing device 24 with an instruction to display a graphical representation of the updated remaining travel time on the touchscreen 30 of the associate mobile computing device 24. An example of this is shown in FIG. 16.

Figure 17:
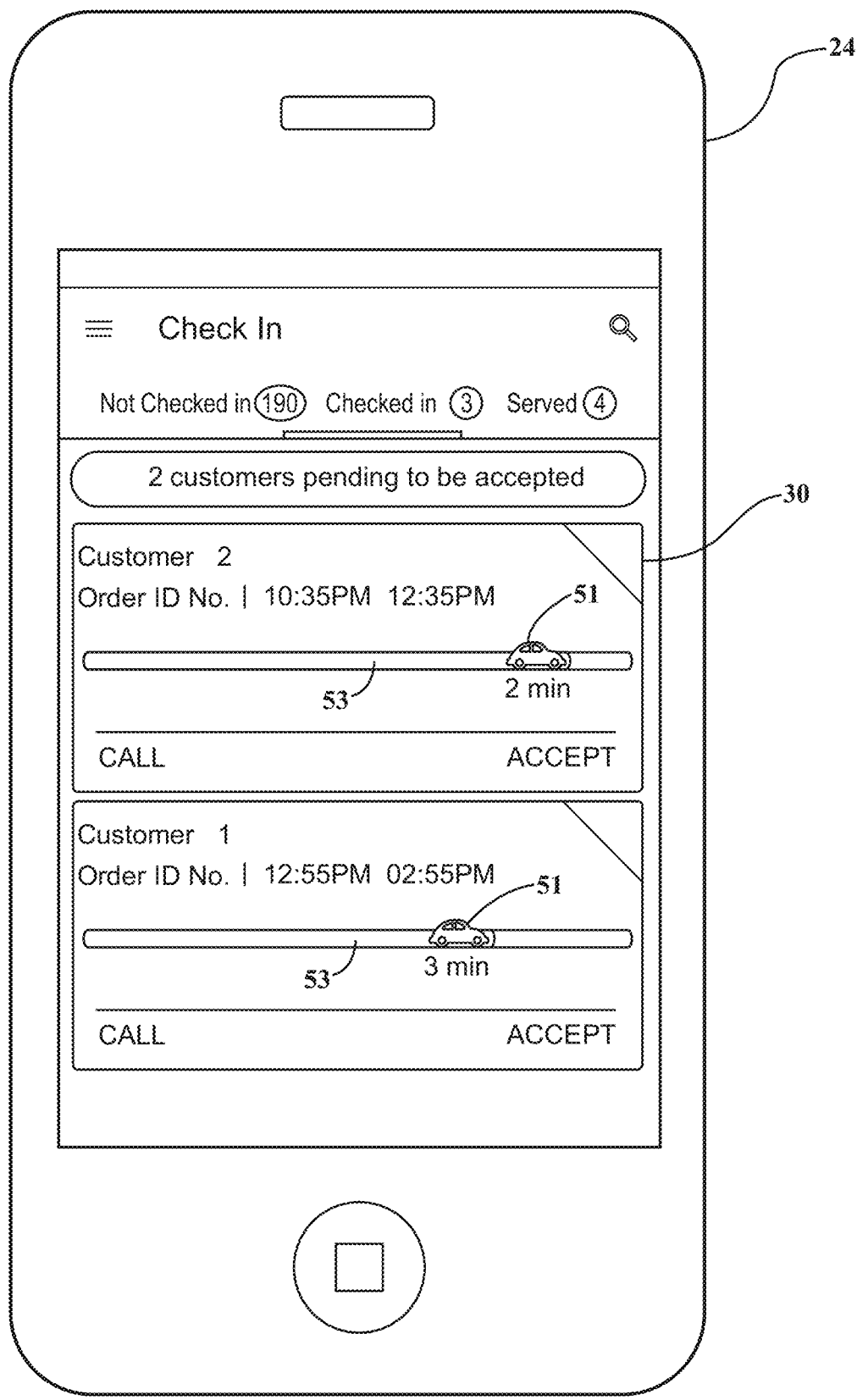
Figure 18:
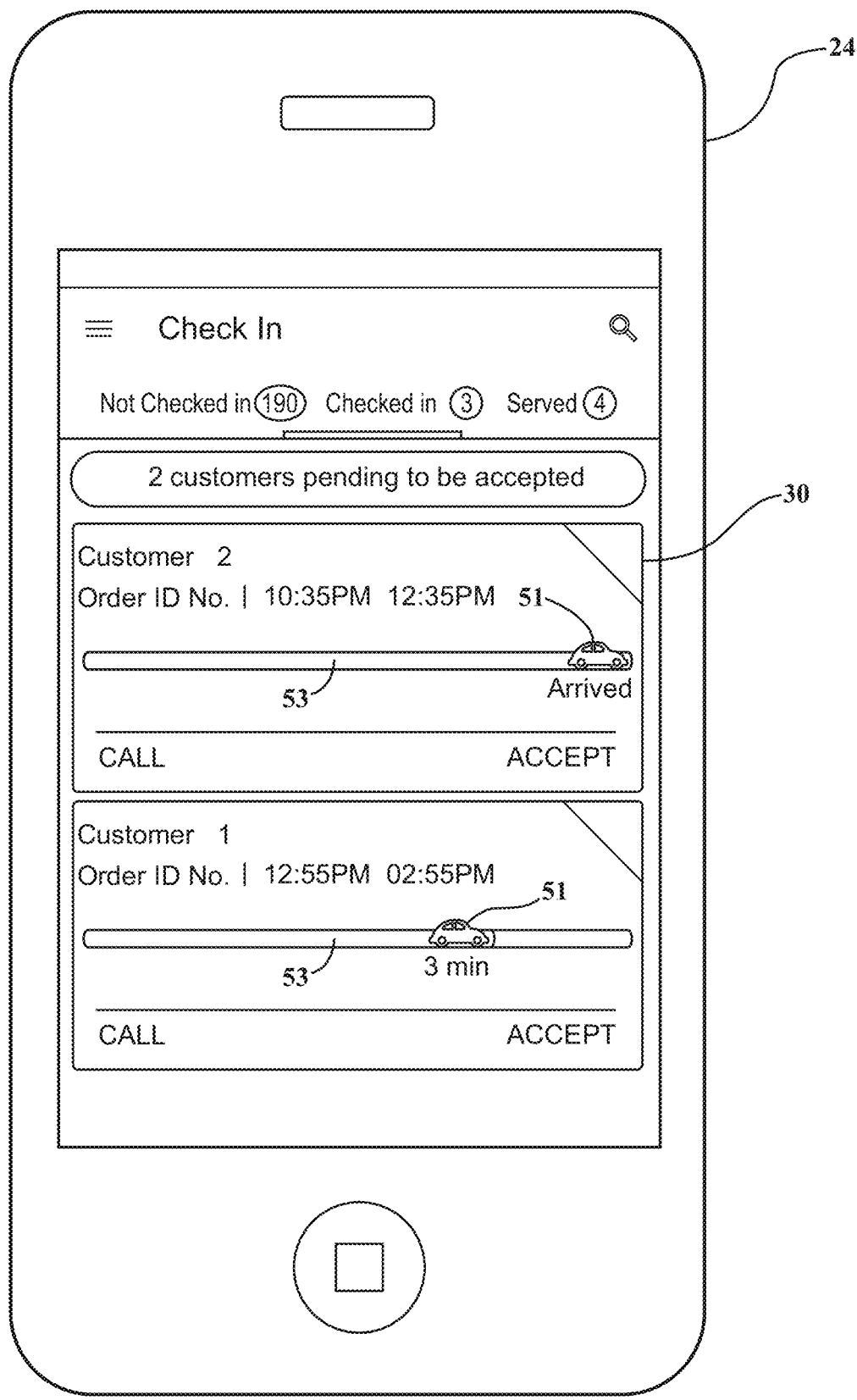

In an embodiment, the server computer 14 continuously obtains the tracking information from the customer mobile computing device 20, continuously updates the estimated remaining travel time, and continuously transmits signals to the associate mobile computing device 24 with instructions to display the updated remaining travel time. For example, and as shown in FIG. 16, the associate mobile computing device 14 displays the updated remaining travel time of 7 minutes until Customer 2 arrives at the store, and the icon (car) 51 has moved and bar 53 has extended from the left-hand-side of the touchscreen 30 to a position closer to the right-hand-side of the touchscreen 30. As the updated remaining travel time is received from the server computer 14, the associate mobile computing device 24 continues to displays the updated travel time on the touchscreen 30. For example, in FIG. 17, the associate mobile computing device 14 displays the further updated remaining travel time of 2 minutes until Customer 2 arrives at the store, and the icon (car) 51 has moved and bar 53 has extended to a position that is even closer to the right-hand-side of the touchscreen 30 than that shown in FIG. 16. The server computer 14 transmits the updated remaining travel time to the associate mobile computing device 24 until the customer mobile computing device 20 has arrived at the store, which is shown by the icon (car) 51 being moved to the right-hand-side of the touchscreen 30 and the bar 53 extending across the touchscreen 30 from the left-hand-side to the right-hand-side, as shown in FIG. 18.

It is possible that the travel time remaining for one of the customers bypasses the travel time remaining for another one of the customers. In such an instance, the server computer 14 may transmit a signal to the associate mobile computing device 24 including an instruction to rearrange the unique customer identifications in the listing if the current order of the unique customer identifications based on the updated estimated remaining travel time is no longer ordered from the shortest to the longest remaining travel time. For example, as shown in FIG. 16, the travel time remaining until Customer 1 arrives at the store is about 3 minutes and the travel time remaining until Customer 2 arrives at the store is about 7 minutes. As shown in FIG. 17, the travel time remaining until Customer 1 arrives at the store is still about 3 minutes (likely indicating that Customer 1 is stopped or parked) and the travel time remaining until Customer 2 arrives at the store is about 2 minutes (indicating that Customer 2 is moving toward the store). Since Customer 2 is now closer to the store than Customer 1 (in terms of the travel time remaining), the server computer 14 transmits a signal to the associate mobile computing device 24 to automatically rearrange the order of the customer unique identifiers displayed on the touchscreen 30. Accordingly, and as shown in FIG. 17, Customers 1 and 2 are rearranged such that Customer 2 is listed at the top of the listing, and Customer 1 is below Customer 2.

It is to be understood that the associate mobile computing device 24 may display any number of customers on the touchscreen 30 of the device 24. The customers displayed typically include customers who have already checked-in. In an example, the server computer 14 may obtain a list of customers all having the same selected time slot for picking up a customer order. In this example, the server computer 14 may transmit a signal to the associate mobile computing device 24 including a listing of all customers with the same time slot regardless of whether the customer has checked-in or not. In an example, the customers that have checked-in may be displayed on the touchscreen 30 in active colors, while the customer that have not checked-in may be displayed on the touchscreen in dull or dim colors.

In another example, the server computer 14 may determine, from the customer profile stored in the database 16, that the customer is a new customer. In this example, the server computer 14 may transmit a signal to the associate mobile computing device 24 including an instruction to display, on the touchscreen 30, an icon proximate the unique customer identification with the term "New" or another similar designation.

Figure 19:
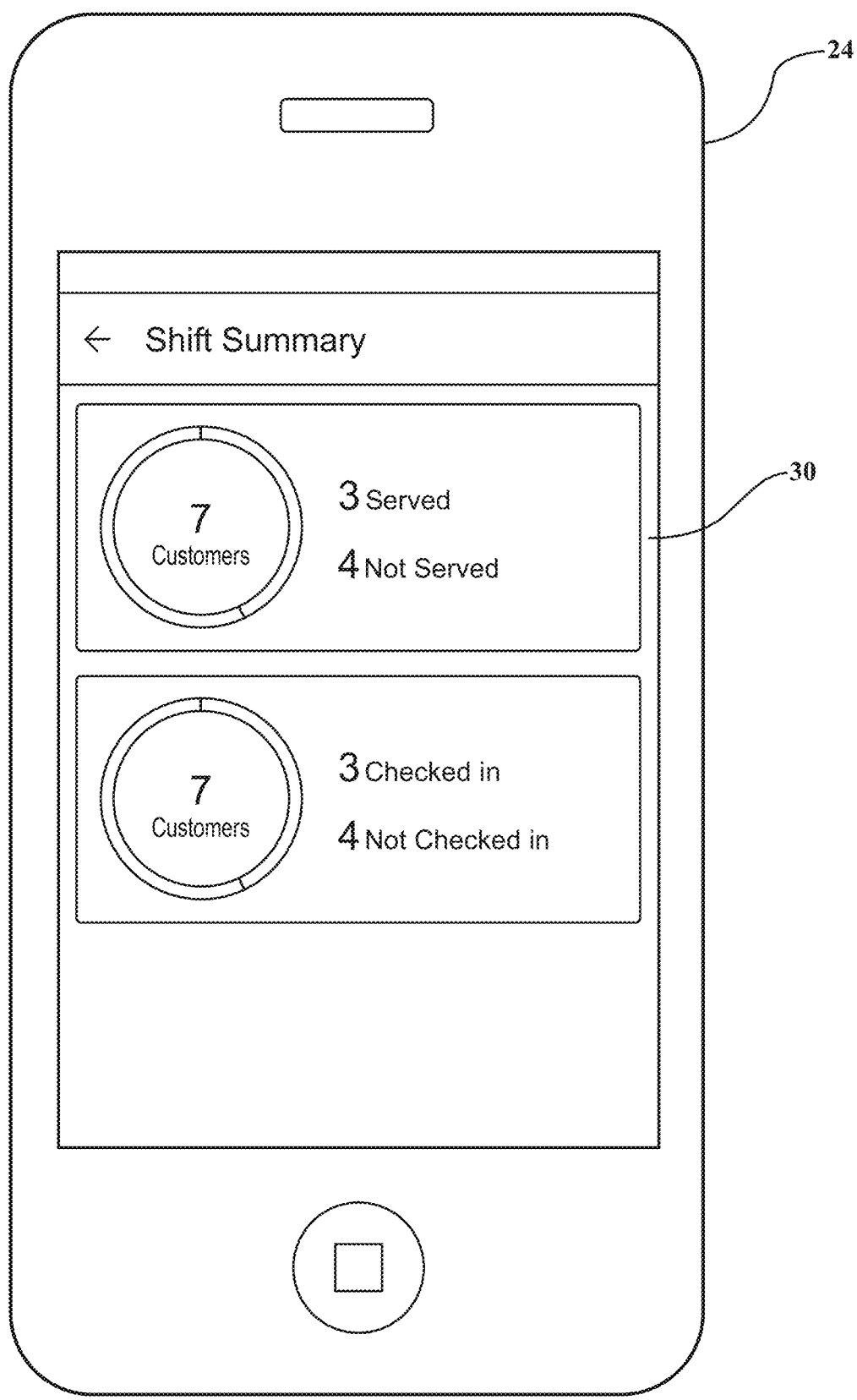

In an embodiment, the processor of the server computer 14 is further programmed to receive a signal from the associate mobile computing device 24 including a summary containing a number of customers that have checked-in, a number of customers that have not checked-in, a number of customers that have been served, a number of customers that have not been served, and combinations thereof. An example of the summary is shown in FIG. 19, where the number of customers that have and have not been checked-in are identified graphically and by alphanumeric characters, and the number of customers that have and have not been served are also identified graphically and by alphanumeric characters. In this example, the graphical form of the summary is defined circular graphs including a first circle graph having two sections, with one of the sections representing the number of customers that have checked-in and the other section representing the number of customers that have not checked-in. The graphical form of the summary is also defined by a second circle graph having two sections, with one of the sections representing the number of customers that have been served and the other representing the number of customers that have not been served. It is to be understood that the summary may be represented by any suitable graphical form, such as a bar graph, a line graph, a pie graph, etc.

Figure 20:
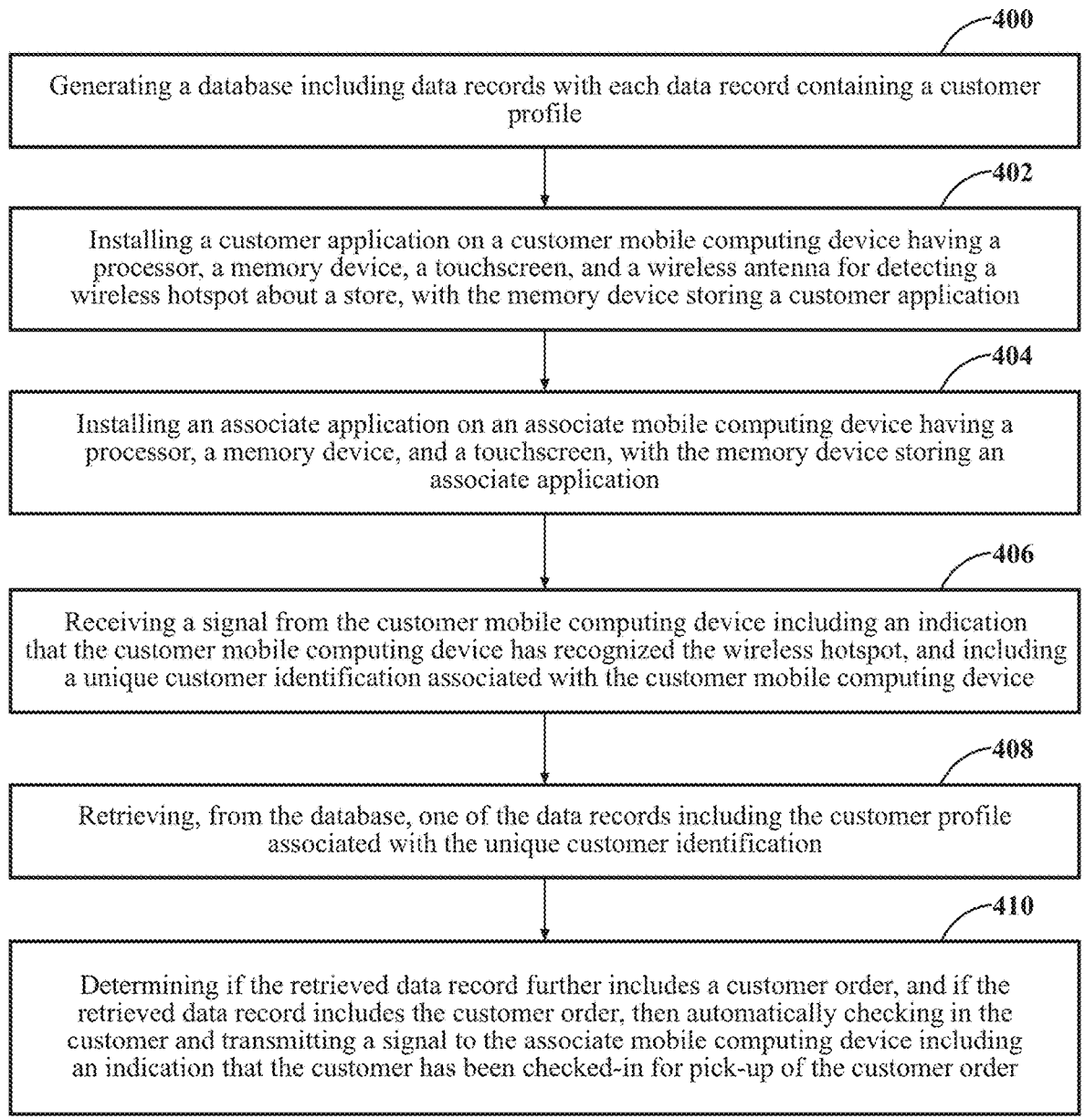
FIG. 20 is a flow diagram illustrating an embodiment of a method for automatically checking-in a customer.
Figure 21:
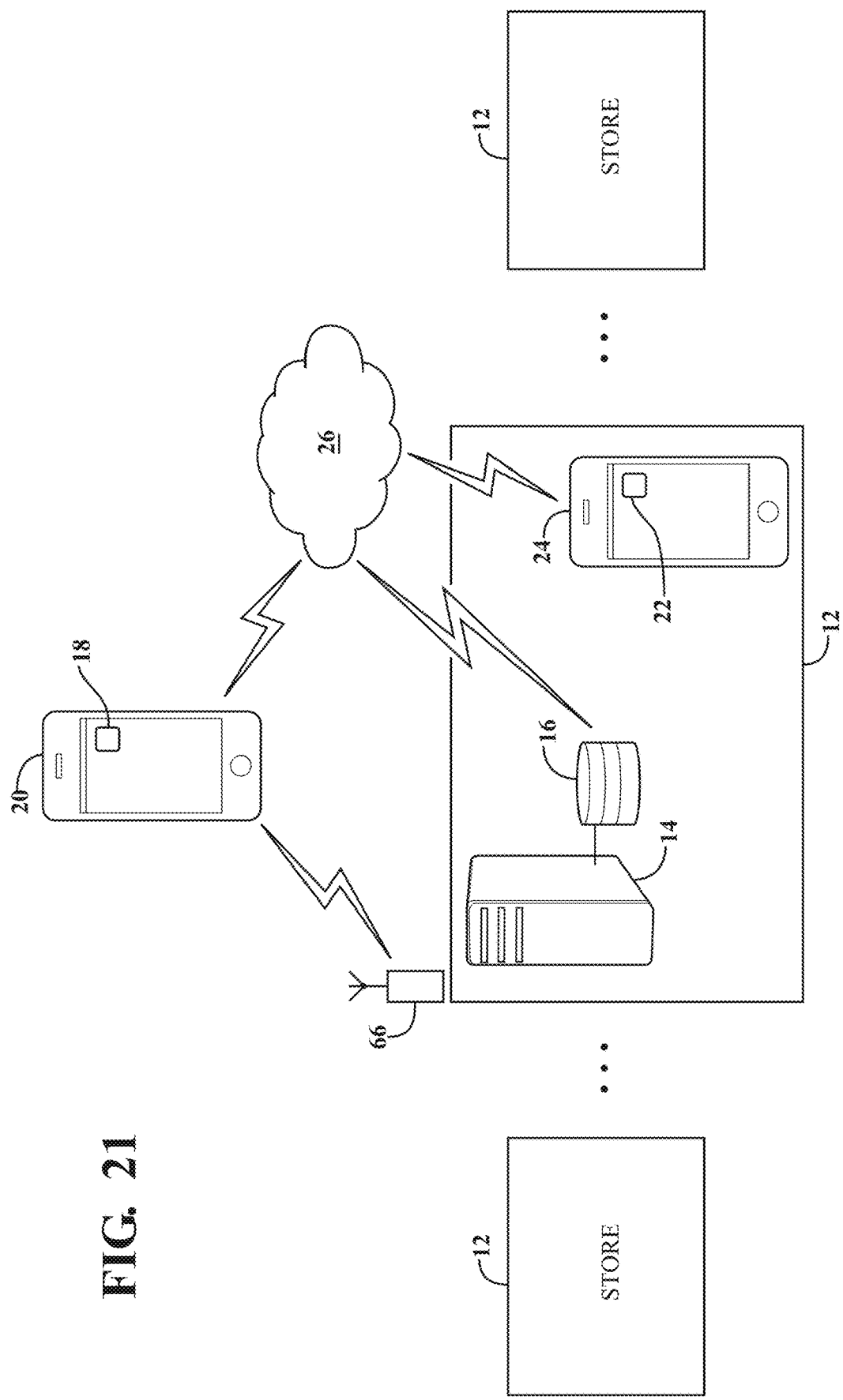
FIG. 21 is a schematic illustrating an embodiment of a system for automatically checking-in a customer.

Referring now to FIG. 20, another embodiment of customer check-in method is described below. In this embodiment, a customer who has not checked-in himself/herself may be automatically checked-in by the server computer 14 upon detecting that the customer is traveling toward the store 12. In particular, this embodiment of the method includes the steps of: generating a database including data records with each record containing a customer profile (as shown in step 400); installing a customer application on a customer mobile computing device having a processor, a memory device, a touchscreen, and a wireless antenna for detecting a wireless hotspot about a store, with the memory device storing a customer application (as shown in step 402); installing an associate application on an associate mobile computing device having a processor, a memory device, and a touchscreen, with the memory device storing an associate application (as shown in step 404); receiving a signal from the customer mobile computing device that the customer mobile computing device has recognized the wireless hotspot, and including a unique customer identification associated with the customer mobile computing device (as shown in step 406); retrieving, from the database, one of the data records including the customer profile associated with the unique customer identification (as shown in step 408); determining if the retrieved data record further includes a customer order and if the retrieved data record includes the customer order, then automatically checking in the customer and transmitting a signal to the associate mobile computing device including an indication that the customer has been checked-in for pick-up of the customer order (as shown in step 410). Details of this embodiment of the method are described below with reference to FIG. 21.

As mentioned above, the customer mobile computing device 20 includes a wireless antenna for detecting a wireless hotspot about the store 12. In an example, and with reference to FIG. 21, the store 12 may include a communications device 66, such as a wireless access point (WAP, which is also known as a hotspot for Wi-Fi connections) that allows wireless devices (e.g., the customer mobile computing device 20) to connect to the server computer 14, or to a network including the server computer 14, utilizing Bluetooth®, Wi-Fi, or other related standards. The customer mobile computing device 20 may connect with the communications device 66 (e.g., the WAP) when the customer mobile computing device 20 is within a wireless connection range of the communications device 20.

In an example, the communications device 66 is configured with wireless fidelity (Wi-Fi) technology, and the customer mobile computing device 66 can recognize a wireless signal propagating from the communications device 66 utilizing the Wi-Fi technology. The WAP, or hotspot, may have a preset wireless access range for Wi-Fi connections. The preset wireless access range for Wi-Fi connections may be any preset distance from the communications device 66. In an example, the preset distance for Wi-Fi connections with the communications device 66 extends only within the store 12. In another example, the preset distance for Wi-Fi connections with the communications device 66 extends a distance outside of the store, such as ½ mile from the store, 1 mile from the store, 5 miles from the store, etc. The wireless range may be preset by presetting the propagation of the wireless signal, as well as the transmission power of the signal.

As an alternative example, the communications device 66 may also be capable of establishing Bluetooth® connections with the customer mobile computing device 20. In this example, the customer mobile computing device 20 includes a Bluetooth® chip for recognizing radio waves propagating from the communications device 66.

In the present embodiment, the method includes generating the database 16 including data records with each record containing a customer profile, as previously described. The method further includes installing the customer application 18 on the customer mobile computing device 20 and installing the associate application 22 on the associate mobile computing device 24, as also previously described. When the customer mobile computing device 20 is within a wireless connection range of the communications device 66, and the device 20 is operating, the device 20 automatically recognizes the wireless hotspot. Upon recognizing the wireless hotspot, the customer mobile computing device 20 automatically transmits a signal to the server computer 14 indicating that the customer mobile computing device 20 has recognized the wireless hotspot. The signal may also indicate that the device 20 is also attempting to establish a Wi-Fi connection with the communications device 66 while within the wireless hotspot.

Typically, recognition of the wireless hotspot is enough for the customer mobile computing device 20 to transmit a signal to the server computer 14, or for the server computer 14 to identify the customer mobile computing device 20. In some instances, however, the customer mobile computing device 20 may also establish a wireless connection with the communications device 66, and in turn, with the server computer 14. In an example, the wireless connection is a Wi-Fi connection.

During the automatic transmission of the signal to the server computer 14 that the device 20 has recognized the wireless hotspot (or has established a wireless connection), the customer mobile computing device 20 also transmits a unique customer identification associated with the customer mobile computing device 20. The server computer 14 utilizes the unique customer identification to identify the customer mobile computing device 20 from the data records stored in the database 16. In an embodiment, the server computer 14 retrieves, from the database 16, one of the data records including the customer profile associated with the unique customer identification.

Utilizing the data record from the database 16, the server computer 14 determines if the retrieved data record includes a customer order. If the data record includes a customer order, then the server computer 14 also determines if there are multiple stores and, if so, which one of the stores the customer order is with. The store that the customer order is with may be determined by further reviewing the data record, which typically includes the location of the store (such as by the postal address) that the customer order is with. The server computer 14 compares the location of the store stored in the data record with the location of the recognized wireless hotspot, and if the locations are close to one another, then the server computer 14 may conclude that the customer is heading toward the store 12 to pick up his/her customer order.

In an example, if the retrieved data record includes the customer order, then the server computer 14 automatically checks-in the customer and transmits a signal to the associate mobile computing device 24 including an indication that the customer has been checked-in for pick-up of the customer order. The signal transmitted to the associate mobile computing device 24 may also include the customer order (which was retrieved from the data record stored in the database 16) and an instruction to fill the order.

In an embodiment, the data record further includes a time slot for when the customer is to pick-up the customer order. As previously mentioned, the time slot may be selected by the customer and stored in the database 16 with the customer order. Upon retrieving the time slot from the data record, the server computer 14 identifies a time that the signal was received from the customer mobile computing device 20 that the customer device 20 recognized the wireless hotspot, compares the time with the time slot for when the customer is to pick-up the customer order, and if the time falls within the time slot, then automatically check-in the customer. Also if the time falls within the time slot, the server computer 14 also transmits a signal to the associate mobile computing device 24 including an instruction to fill the customer order.

The associate at the store 12 may proceed to fill the order upon receiving the instruction from the server computer 14 so that the customer order is filled by the time the customer arrives at the store. Since the wireless hotspot enables short range Wi-Fi connections, the associate may assume that the customer is close to the store, and will likely be picking up the customer order very soon.

In an embodiment, the server computer 14 transmits a signal to the customer mobile computing device 20 including a notification that the customer has a pending customer order at the store, and that the customer has been automatically checked-in for pick up. If the customer is intending to go to the store to pick-up the order, then the customer needs to do nothing more than to arrive at the store and be served. However, if the customer is not intending to go to the store, then the customer can send a response, utilizing the customer application 18 on the customer device 20, indicating that the customer is not picking up the customer order at this time. Upon receiving this response, the server computer 14 may transmit a signal to the associate mobile computing device 24 including an instruction to put the items of the customer order back on the shelves, as the customer is not on his/her way to pick-up the customer order.

The above description of illustrated embodiments and examples of the present disclosure, including what is described in the Abstract, are not intended to be exhaustive or to be a limitation to the precise forms disclosed. While specific embodiments of, and examples for, the present disclosure are described herein for illustrative purposes, various equivalent modifications are possible without departing from the broader spirit and scope of the present disclosure.

What is claimed is:

1. A customer check-in system associated with a store, the customer check-in system comprising:
   a server computer of the store and including a processor coupled to a memory device, the processor being programmed to:
      install a customer application on a customer mobile computing device having a processor, a memory device, and a touchscreen, with the memory device of the customer mobile computing device storing the customer application that, when executed, causes the processor of the customer mobile computing device to display a graphical user interface on the touchscreen of the customer mobile computing device that is usable by a customer;
      install an associate application on an associate mobile computing device having a processor, a memory device, and a touchscreen, with the memory device of the associate mobile computing device storing the associate application that, when executed, causes the processor of the associate mobile computing device to display a graphical user interface on the touchscreen of the associate mobile computing device that is usable by an associate of the store;
      receive, from the customer mobile computing device, before the customer mobile computing device arrives at the store and subsequent to a customer order being placed, a first signal including a unique customer identification associated with the customer mobile computing device, an indication that the customer has checked-in remotely to pick up the customer order from the store, and a customer-selected time slot for picking up the customer order from the store;
      during the customer-selected time slot and before the customer mobile computing device arrives at the store, obtain tracking information of a current location of the customer mobile computing device;
      utilize the tracking information to estimate an amount of travel time remaining until the customer mobile computing device arrives at the store;
      transmit a second signal to the associate mobile computing device including the unique customer identification and a first estimated travel time remaining until the customer mobile computing device associated with the unique customer identification arrives at the store; and
      transmit at least one second signal to the associate mobile computing device including (a) an updated estimated amount of travel time remaining until the customer mobile computing device arrives at the store and (b) an instruction to display a graphical representation of the updated estimated amount of travel time remaining on the touchscreen of the associate mobile computing device.

2. The customer check-in system of claim 1 further comprising a database including data records containing customer order information, and wherein the processor of the server computer is further programmed to:
   retrieve one of the data records from the database including the customer order information associated with the unique customer identification; and
   transmit a second signal to the associate mobile computing device including the one of the data records that was retrieved containing the customer order information before the customer mobile computing device arrives at the store.

3. The customer check-in system of claim 1, wherein the processor of the server computer is further programmed to receive, before the customer mobile computing device arrives at the store, a first signal from the customer mobile computing device including an indication that the server computer is allowed to track the current location of the customer mobile computing device.

4. The customer check-in system of claim 1, wherein the processor of the server computer is further programmed to receive, before the customer mobile computing device arrives at the store, a first signal including an indication that the customer is walking to the store to pick up the customer order.

5. The customer check-in system of claim 1, wherein the processor of the server computer is further programmed to receive a first signal including vehicle information of a vehicle that the customer plans to use for traveling to the store to pick up the customer order, wherein the vehicle information includes a vehicle color.

6. The customer check-in system of claim 1, wherein the processor of the server computer is further programmed to transmit a third signal to the customer mobile computing device to display, on the touchscreen of the customer mobile computing device, at least one of an interactive map including vehicle route information, an approximate amount of time until arrival at the store, an approximate arrival time, a travel distance to the store, an address of the store, the customer-selected time slot for picking up the customer order, an icon identifying a customer-selected color of a vehicle that the customer plans to use to pick up the customer order from the store, and an icon identifying a customer-selected preference to walk to the store to pick up the customer order.

7. The customer check-in system of claim 1, wherein the processor of the server computer is further programmed to transmit a third signal to the customer mobile computing device including an identification of the associate at the store who is filling the customer order.

8. The customer check-in system of claim 1, wherein the processor of the server computer is further programmed to receive, a fourth signal from the associate mobile computing device, an identification of a store location and an identification of the associate at the store location available to fill the customer order.

9. The customer check-in system of claim 1, wherein the processor of the server computer is further programmed to transmit a second signal to the associate mobile computing device including an indication that the customer has checked-in.

10. The customer check-in system of claim 1, wherein the graphical representation displayed on the associate mobile computing device includes an icon moveable across the touchscreen of the associate mobile computing device along a bar, with the bar having a changeable length that is representative of an estimated amount of travel time remaining until the customer mobile computing device arrives at the store.

11. One or more non-transitory computer-readable storage media, having computer-executable instructions embodied thereon, wherein when executed by at least one processor, the computer-executable instructions cause the at least one processor to:
   operate a customer mobile computing device to display a graphical user interface that is usable by a customer on a touchscreen of the customer mobile computing device;

operate an associate mobile computing device to display a graphical user interface that is usable by an associate of a store on a touchscreen of the associate mobile computing device;

operate, before the customer mobile computing device arrives at the store and subsequent to a customer order being placed, a server computer to receive a first signal including a unique customer identification associated with the customer mobile computing device, an indication that the customer has checked-in remotely to pick up the customer order from the store, and a customer-selected time slot for picking up the customer order from the store;

operate, before the customer mobile computing device arrives at the store, the server computer to obtain tracking information of a current location of the customer mobile computing device during the customer-selected time slot;

operate the server computer to utilize the tracking information to estimate an amount of travel time remaining until the customer mobile computing device arrives at the store;

operate the server computer to transmit a second signal to the associate mobile computing device including the unique customer identification and a first estimated travel time remaining until the customer mobile computing device associated with the unique customer identification arrives at the store; and operate the server computer to transmit at least one second signal to the associate mobile computing device including an updated estimated amount of travel time remaining until the customer mobile computing device arrives at the store and an instruction to display a graphical representation of the updated estimated amount of travel time remaining on the touchscreen of the associate mobile computing device.

12. A customer check-in system associated with a store, a system comprising:

a server computer of the store and including a processor coupled to a memory device, the processor being programmed to:

install a customer application on each of a plurality of customer mobile computing devices, wherein each of the customer mobile computing devices having a processor, a memory device, and a touchscreen, with the memory device of a customer mobile computing device storing the customer application that, when executed, causes the processor of the customer mobile computing device to display a graphical user interface on the touchscreen of the customer mobile computing device that is usable by a customer;

install an associate application on an associate mobile computing device having a processor, a memory device, and a touchscreen, with the memory device of the associate mobile computing device storing the associate application that, when executed, causes the processor of the associate mobile computing device to display a graphical user interface on the touchscreen of the associate mobile computing device that is usable by an associate of the store;

receive, from each of the customer mobile computing devices, before the customer mobile computing device arrives at the store and subsequent to a customer order being placed, a first signal including a unique customer identification associated with the customer mobile computing device and an indication that the customer has checked-in remotely to pick up the customer order from the store, and a customer-selected time slot for picking up the customer order from the store;

obtain, before the customer mobile computing device arrives at the store, tracking information of a current location of each of the customer mobile computing devices during the customer-selected time slot;

utilize the tracking information to estimate an amount of travel time remaining until each of the customer mobile computing devices arrive at the store;

transmit a second signal to the associate mobile computing device including the unique customer identification and a first estimated travel time remaining until the customer mobile computing device associated with the unique customer identification arrives at the store, the second signal further including an instruction to display a listing, on the touchscreen of the associate mobile computing device, including the unique customer identification for each of the customer mobile computing devices and a graphical representation of the estimated travel time remaining for each of the customer mobile computing devices, with the listing including the unique customer identification arranged from a shortest travel time to a longest travel time remaining until the customer mobile computing devices arrive at the store; and transmit at least one second signal to the associate mobile computing device including an updated estimated travel time remaining until each of the customer mobile computing devices arrives at the store, the at least one second signal further including an instruction to rearrange one or more unique customer identifications in the listing when a sequence of the one or more unique customer identifications based on the updated estimated travel time remaining is no longer arranged from the shortest travel time to the longest travel time remaining.

13. The customer check-in system of claim 12 further comprising a database including data records containing customer order information, and wherein the processor of the server computer is further programmed to:

retrieve one of the data records from the database including the customer order information associated with each of the one or more unique customer identifications; and transmit a second signal to the associate mobile computing device including the one of the data records that was retrieved containing the customer order information.

14. The customer check-in system of claim 12, wherein the processor of the server computer is further programmed to:

utilize the tracking information to determine that one of the customer mobile computing devices has arrived at the store; and transmit a second signal to the associate mobile computing device indicating that the customer associated with the one of the customer mobile computing devices has arrived at the store.

15. The customer check-in system of claim 14, wherein the processor of the server computer is further programmed to receive a fourth signal from the associate mobile computing device indicating that the customer associated with the one of the customer mobile computing devices has been served.

16. The customer check-in system of claim 12, wherein the processor of the server computer is further programmed to:
  utilize the tracking information to determine that one of the customer mobile computing devices moving away from the store; and
  transmit a second signal to the associate mobile computing device indicating that the customer associated with the one of the customer mobile computing devices is no longer moving toward the store.

17. The customer check-in system of claim 12, wherein the processor of the server computer is further programmed to receive a fourth signal from the associate mobile computing device including a summary containing a number of customers that have checked-in, a number of customers that have not checked-in, a number of customers that have been served, a number of customers that have not been served, and combinations thereof.

18. The customer check-in system of claim 12, wherein the processor of the server computer is further programmed to receive a first signal including an indication that the customer is walking to the store to pick up the customer order.

19. The customer check-in system of claim 12, wherein the processor of the server computer is further programmed to receive a first signal including vehicle information of a vehicle that the customer plans to use for traveling to the store to pick up the customer order, wherein the vehicle information includes a vehicle color.

20. The customer check-in system of claim 19, wherein the graphical representation of an estimated amount of travel time remaining is a vehicle and the processor of the server computer is further programmed to transmit a second signal to the associate mobile computing device including an instruction to display the vehicle with the vehicle color on the touchscreen of the associate mobile computing device.

21. The customer check-in system of claim 12, wherein the processor of the server computer is further programmed to transmit a second signal to the associate mobile computing device including an indication that the customer has checked-in.

22. The customer check-in system of claim 12, wherein the graphical representation displayed on the associate mobile computing device includes an icon moveable across the touchscreen of the associate mobile computing device along a bar, with the bar having a changeable length that is representative of an estimated amount of travel time remaining until the customer mobile computing device arrives at the store.

23. One or more non-transitory computer-readable storage media, having computer-executable instructions embodied thereon, wherein when executed by at least one processor, the computer-executable instructions cause the at least one processor to:
  operate a customer mobile computing device to display a graphical user interface that is usable by a customer on a touchscreen of the customer mobile computing device;
  operate an associate mobile computing device to display a graphical user interface that is usable by an associate of a store on a touchscreen of the associate mobile computing device;
  operate a server computer to receive, before the customer mobile computing device arrives at the store and subsequent to a customer order being placed, receive a first signal including a unique customer identification associated with the customer mobile computing device and an indication that the customer has checked-in remotely to pick up the customer order from the store, and a customer-selected time slot for picking up the customer order from the store;
  operate the server computer to obtain, before the customer mobile computing device arrives at the store, tracking information of a current location of the customer mobile computing device during the customer-selected time slot;
  operate the server computer to utilize the tracking information to estimate an amount of travel time remaining until the customer mobile computing device arrives at the store;
  operate the server computer to transmit a second signal to the associate mobile computing device including the unique customer identification and a first estimated travel time remaining until the customer mobile computing device associated with the unique customer identification arrives at the store, the second signal further including an instruction to display a listing, on the touchscreen of the associate mobile computing device, including the unique customer identification for each of one or more customer mobile computing devices and a graphical representation of the estimated travel time remaining for each of the one or more customer mobile computing devices, with the listing including the unique customer identification arranged from a shortest travel time to a longest travel time remaining until the each of the one or more customer mobile computing devices arrive at the store; and
  operate the server computer to transmit at least one second signal to the associate mobile computing device including an updated estimated travel time remaining until each of the one or more customer mobile computing devices arrive at the store, the at least one second signal further including an instruction to rearrange one or more unique customer identifications in the listing when a sequence of the one or more unique customer identifications based on the updated estimated travel time remaining is no longer arranged from the shortest travel time to the longest travel time remaining.

* * * * *